United States Patent
McLachlan et al.

(10) Patent No.: US 10,417,591 B2
(45) Date of Patent: Sep. 17, 2019

(54) RECURSIVE PROCESSING OF OBJECT ALLOCATION RULES

(71) Applicant: Apptio, Inc., Bellevue, WA (US)

(72) Inventors: Paul Damien McLachlan, Newcastle, WA (US); Supin Ko, Seattle, WA (US); Eric Yves Theriault, Seattle, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 13/935,147

(22) Filed: Jul. 3, 2013

(65) Prior Publication Data

US 2015/0012328 A1 Jan. 8, 2015

(51) Int. Cl.
*G06Q 10/00* (2012.01)
*G06Q 10/06* (2012.01)

(52) U.S. Cl.
CPC .............. *G06Q 10/06315* (2013.01)

(58) Field of Classification Search
CPC ........................................ G06Q 10/00–50/00
USPC ................................. 705/7.11–7.42
See application file for complete search history.

(56) References Cited

U.S. PATENT DOCUMENTS

| | | | |
|---|---|---|---|
| 4,744,026 A * | 5/1988 | Vanderbei | G06Q 10/06 705/7.22 |
| 5,249,120 A * | 9/1993 | Foley | 705/1.1 |
| 5,615,121 A | 3/1997 | Babayev et al. | |
| 5,721,919 A | 2/1998 | Morel et al. | |
| 5,758,327 A | 5/1998 | Gardner et al. | |
| 5,799,286 A | 8/1998 | Morgan et al. | |
| 5,802,508 A * | 9/1998 | Morgenstern | G06N 5/027 706/55 |
| 5,903,453 A | 5/1999 | Stoddard, II | |
| 5,970,476 A | 10/1999 | Fahey | |
| 5,991,741 A | 11/1999 | Speakman et al. | |
| 6,014,640 A * | 1/2000 | Bent | 705/30 |
| 6,032,123 A * | 2/2000 | Jameson | G06Q 10/04 705/7.22 |
| 6,047,290 A | 4/2000 | Kennedy et al. | |

(Continued)

FOREIGN PATENT DOCUMENTS

JP 2011134268 A 7/2011

OTHER PUBLICATIONS

US 5,649,211 A, 04/1997, Horkin et al. (withdrawn)

(Continued)

*Primary Examiner* — Alan S Miller
(74) *Attorney, Agent, or Firm* — John W. Branch; Lowe Graham Jones PLLC

(57) ABSTRACT

Various embodiments are directed towards allocating costs for a plurality of cost objects. In at least one of the various embodiments, a source object and a target object in a data model may be determined such that an allocation rule is used to define one or more cost allocations where the costs flows from the source object to the target object. Allocation rules that are part of a recursive allocation rule may be executed on the source object and the target object until a terminal condition is met. The cost value that corresponds to the source object may be modified based on the allocation rule and the generated cost value. This process may continue until a terminal condition is met. After the terminal condition has been met final costs value corresponding to the target object and the source object may be generated and displayed.

30 Claims, 17 Drawing Sheets

(56) References Cited

U.S. PATENT DOCUMENTS

| | | | |
|---|---|---|---|
| 6,208,993 B1 | 3/2001 | Shadmon | |
| 6,249,769 B1 | 6/2001 | Ruffin et al. | |
| 6,253,192 B1 | 6/2001 | Corlett et al. | |
| 6,308,166 B1 | 10/2001 | Breuker et al. | |
| 6,321,207 B1 * | 11/2001 | Ye | 705/7.25 |
| 6,330,552 B1 * | 12/2001 | Farrar et al. | 705/400 |
| 6,424,969 B1 | 7/2002 | Gruenwald | |
| 6,507,825 B2 | 1/2003 | Suh | |
| 6,578,005 B1 * | 6/2003 | Lesaint et al. | 705/7.14 |
| 6,594,672 B1 | 7/2003 | Lampson et al. | |
| 6,647,370 B1 | 11/2003 | Fu et al. | |
| 6,738,736 B1 | 5/2004 | Bond | |
| 6,789,252 B1 | 9/2004 | Burke et al. | |
| 6,832,212 B1 | 12/2004 | Zenner et al. | |
| 6,839,719 B2 | 1/2005 | Wallace | |
| 6,877,034 B1 | 4/2005 | Machin et al. | |
| 6,882,630 B1 | 4/2005 | Seaman | |
| 6,965,867 B1 | 11/2005 | Jameson | |
| 6,983,321 B2 | 1/2006 | Trinon et al. | |
| 7,050,997 B1 | 5/2006 | Wood, Jr. | |
| 7,130,822 B1 | 10/2006 | Their et al. | |
| 7,149,700 B1 | 12/2006 | Munoz et al. | |
| 7,177,850 B2 * | 2/2007 | Argenton et al. | 705/400 |
| 7,263,527 B1 | 8/2007 | Malcom | |
| 7,305,491 B2 | 12/2007 | Miller et al. | |
| 7,308,427 B1 | 12/2007 | Hood | |
| 7,321,869 B1 * | 1/2008 | Phibbs, Jr. | 705/30 |
| 7,386,535 B1 | 6/2008 | Kalucha et al. | |
| 7,418,438 B2 | 6/2008 | Gould et al. | |
| 7,505,888 B2 | 3/2009 | Legault et al. | |
| 7,590,937 B2 | 9/2009 | Jacobus et al. | |
| 7,634,431 B2 * | 12/2009 | Stratton | 705/30 |
| 7,653,449 B2 | 1/2010 | Hunter et al. | |
| 7,664,729 B2 | 2/2010 | Klein et al. | |
| 7,703,003 B2 | 4/2010 | Payne et al. | |
| 7,725,343 B2 | 5/2010 | Johanson et al. | |
| 7,742,961 B2 | 6/2010 | Aaron et al. | |
| 7,752,077 B2 | 7/2010 | Holden et al. | |
| 7,761,548 B2 | 7/2010 | Snyder et al. | |
| 7,769,654 B1 | 8/2010 | Hurewitz | |
| 7,774,458 B2 | 8/2010 | Trinon et al. | |
| 7,783,759 B2 | 8/2010 | Eilam et al. | |
| 7,801,755 B2 | 9/2010 | Doherty et al. | |
| 7,805,400 B2 | 9/2010 | Teh et al. | |
| 7,813,948 B2 * | 10/2010 | Ratzloff | G06Q 10/00 705/7.22 |
| 7,852,711 B1 | 12/2010 | Fitzgerald et al. | |
| 7,870,051 B1 | 1/2011 | En et al. | |
| 7,877,742 B2 * | 1/2011 | Duale et al. | 717/150 |
| 7,899,235 B1 | 3/2011 | Williams et al. | |
| 7,917,555 B2 | 3/2011 | Gottumukkala et al. | |
| 7,930,396 B2 | 4/2011 | Trinon et al. | |
| 7,933,861 B2 | 4/2011 | Zadorozhny | |
| 7,945,489 B2 * | 5/2011 | Weiss et al. | 705/30 |
| 7,966,235 B1 | 6/2011 | Capelli et al. | |
| 7,966,266 B2 | 6/2011 | Delvat | |
| 8,010,584 B1 * | 8/2011 | Craver et al. | 707/812 |
| 8,024,241 B2 * | 9/2011 | Bailey et al. | 705/35 |
| 8,073,724 B2 | 12/2011 | Harthcryde et al. | |
| 8,121,959 B2 | 2/2012 | Delvat | |
| 8,175,863 B1 | 5/2012 | Ostermeyer et al. | |
| 8,195,524 B2 | 6/2012 | Sandholm et al. | |
| 8,195,785 B2 | 6/2012 | Snyder et al. | |
| 8,200,518 B2 | 6/2012 | Bailey et al. | |
| 8,200,561 B1 | 6/2012 | Scott et al. | |
| 8,209,218 B1 | 6/2012 | Basu et al. | |
| 8,214,829 B2 | 7/2012 | Neogi et al. | |
| 8,260,959 B2 | 9/2012 | Rudkin et al. | |
| 8,370,243 B1 | 2/2013 | Cernyar | |
| 8,396,775 B1 | 3/2013 | Mindlin | |
| 8,423,428 B2 * | 4/2013 | Grendel et al. | 705/26.81 |
| 8,484,355 B1 | 7/2013 | Lochhead et al. | |
| 8,533,904 B2 | 9/2013 | Conrad | |
| 8,543,438 B1 | 9/2013 | Fleiss | |
| 8,600,830 B2 | 12/2013 | Hoffberg | |
| 8,601,263 B1 | 12/2013 | Shankar et al. | |
| 8,606,827 B2 | 12/2013 | Williamson | |
| 8,655,714 B2 | 2/2014 | Weir et al. | |
| 8,667,385 B1 | 3/2014 | Mui et al. | |
| 8,766,981 B2 | 7/2014 | McLachlan et al. | |
| 8,768,976 B2 * | 7/2014 | McLachlan et al. | 707/805 |
| 8,826,230 B1 | 8/2014 | Michelsen | |
| 8,935,301 B2 | 1/2015 | Chmiel et al. | |
| 8,937,618 B2 | 1/2015 | Erez et al. | |
| 8,970,476 B2 | 3/2015 | Chan | |
| 8,996,552 B2 | 3/2015 | Munkes et al. | |
| 9,015,692 B1 | 4/2015 | Clavel | |
| 9,020,830 B2 | 4/2015 | Purpus et al. | |
| 9,104,661 B1 | 8/2015 | Evans | |
| 9,213,573 B2 | 12/2015 | French et al. | |
| 9,281,012 B2 | 3/2016 | Hedges | |
| 9,384,511 B1 | 7/2016 | Purpus | |
| 9,529,863 B1 | 12/2016 | Gindin et al. | |
| 9,805,311 B1 | 10/2017 | Mohler | |
| 2002/0002557 A1 | 1/2002 | Straube et al. | |
| 2002/0016752 A1 | 2/2002 | Suh | |
| 2002/0056004 A1 | 5/2002 | Smith | |
| 2002/0069102 A1 | 6/2002 | Vellante et al. | |
| 2002/0082966 A1 | 6/2002 | O'Brien et al. | |
| 2002/0087441 A1 * | 7/2002 | Wagner, Jr. | G06Q 30/06 705/30 |
| 2002/0107914 A1 | 8/2002 | Charisius et al. | |
| 2002/0123945 A1 | 9/2002 | Booth et al. | |
| 2002/0145040 A1 | 10/2002 | Grabski | |
| 2002/0156710 A1 | 10/2002 | Ryder | |
| 2002/0174049 A1 | 11/2002 | Kitahara | |
| 2002/0178198 A1 | 11/2002 | Steele | |
| 2002/0194329 A1 | 12/2002 | Alling | |
| 2003/0019350 A1 | 1/2003 | Khosla | |
| 2003/0074269 A1 | 4/2003 | Viswanath | |
| 2003/0083388 A1 | 5/2003 | L'Alloret | |
| 2003/0083888 A1 * | 5/2003 | Argenton | G06Q 30/0283 705/400 |
| 2003/0083912 A1 | 5/2003 | Covington et al. | |
| 2003/0093310 A1 | 5/2003 | Macrae | |
| 2003/0110113 A1 | 6/2003 | Martin | |
| 2003/0139960 A1 * | 7/2003 | Nishikawa et al. | 705/8 |
| 2003/0139986 A1 | 7/2003 | Roberts, Jr. | |
| 2003/0158724 A1 | 8/2003 | Uchida | |
| 2003/0158766 A1 | 8/2003 | Mital et al. | |
| 2003/0172018 A1 | 9/2003 | Chen et al. | |
| 2003/0172368 A1 | 9/2003 | Alumbaugh et al. | |
| 2003/0195780 A1 * | 10/2003 | Arora et al. | 705/7 |
| 2003/0208493 A1 | 11/2003 | Hall et al. | |
| 2003/0217033 A1 | 11/2003 | Sandler et al. | |
| 2003/0233301 A1 | 12/2003 | Chen et al. | |
| 2003/0236721 A1 * | 12/2003 | Plumer et al. | 705/30 |
| 2004/0030628 A1 | 2/2004 | Takamoto et al. | |
| 2004/0039685 A1 | 2/2004 | Hambrecht et al. | |
| 2004/0059611 A1 | 3/2004 | Kananghinis et al. | |
| 2004/0059679 A1 | 3/2004 | Mizumachi et al. | |
| 2004/0073477 A1 | 4/2004 | Heyns et al. | |
| 2004/0093344 A1 | 5/2004 | Berger et al. | |
| 2004/0111509 A1 | 6/2004 | Eilam et al. | |
| 2004/0133676 A1 | 7/2004 | Sproule | |
| 2004/0138942 A1 | 7/2004 | Pearson et al. | |
| 2004/0186762 A1 | 9/2004 | Beaven et al. | |
| 2004/0243438 A1 * | 12/2004 | Mintz | 705/2 |
| 2004/0249737 A1 | 12/2004 | Tofte | |
| 2005/0004856 A1 | 1/2005 | Brose et al. | |
| 2005/0033631 A1 | 2/2005 | Wefers et al. | |
| 2005/0038788 A1 | 2/2005 | Dettinger et al. | |
| 2005/0044224 A1 | 2/2005 | Jun et al. | |
| 2005/0060298 A1 | 3/2005 | Agapi et al. | |
| 2005/0060317 A1 | 3/2005 | Lott et al. | |
| 2005/0071285 A1 | 3/2005 | Laicher et al. | |
| 2005/0091102 A1 | 4/2005 | Retsina | |
| 2005/0120032 A1 | 6/2005 | Liebich et al. | |
| 2005/0131870 A1 | 6/2005 | Krishnaswamy et al. | |
| 2005/0131929 A1 | 6/2005 | Bailey | |
| 2005/0144110 A1 | 6/2005 | Chen et al. | |
| 2005/0171918 A1 * | 8/2005 | Eden et al. | 705/400 |
| 2005/0235020 A1 | 10/2005 | Gabelmann et al. | |

(56) References Cited

U.S. PATENT DOCUMENTS

| | | | |
|---|---|---|---|
| 2005/0246482 A1* | 11/2005 | Gabelmann | G06Q 10/087 711/111 |
| 2006/0010156 A1 | 1/2006 | Netz et al. | |
| 2006/0010294 A1 | 1/2006 | Pasumansky et al. | |
| 2006/0041458 A1 | 2/2006 | Ringrose et al. | |
| 2006/0041501 A1 | 2/2006 | Tabata et al. | |
| 2006/0059032 A1 | 3/2006 | Wong et al. | |
| 2006/0074980 A1 | 4/2006 | Sarkar | |
| 2006/0080264 A1* | 4/2006 | Zhang et al. | 705/400 |
| 2006/0085302 A1* | 4/2006 | Weiss et al. | 705/30 |
| 2006/0085465 A1 | 4/2006 | Nori et al. | |
| 2006/0106658 A1* | 5/2006 | Johanson et al. | 705/7 |
| 2006/0116859 A1 | 6/2006 | Legault et al. | |
| 2006/0116975 A1 | 6/2006 | Gould et al. | |
| 2006/0126552 A1 | 6/2006 | Lee et al. | |
| 2006/0136281 A1 | 6/2006 | Peters et al. | |
| 2006/0143219 A1 | 6/2006 | Smith et al. | |
| 2006/0161879 A1* | 7/2006 | Lubrecht et al. | 717/101 |
| 2006/0167703 A1* | 7/2006 | Yakov | 705/1 |
| 2006/0178960 A1 | 8/2006 | Lepman | |
| 2006/0179012 A1 | 8/2006 | Jacobs | |
| 2006/0190497 A1 | 8/2006 | Inturi et al. | |
| 2006/0200400 A1 | 9/2006 | Hunter et al. | |
| 2006/0200477 A1 | 9/2006 | Barrenechea | |
| 2006/0212146 A1 | 9/2006 | Johnson et al. | |
| 2006/0212334 A1 | 9/2006 | Jackson | |
| 2006/0224740 A1 | 10/2006 | Sievers-Tostes | |
| 2006/0224946 A1 | 10/2006 | Barrett et al. | |
| 2006/0228654 A1 | 10/2006 | Sanjar et al. | |
| 2006/0235785 A1 | 10/2006 | Chait et al. | |
| 2006/0259468 A1 | 11/2006 | Brooks et al. | |
| 2006/0277074 A1 | 12/2006 | Einav et al. | |
| 2006/0282429 A1 | 12/2006 | Hernandez-Sherrington et al. | |
| 2007/0038494 A1 | 2/2007 | Kreitzberg et al. | |
| 2007/0088641 A1 | 4/2007 | Aaron et al. | |
| 2007/0113289 A1 | 5/2007 | Blumenau | |
| 2007/0118516 A1 | 5/2007 | Li et al. | |
| 2007/0124162 A1 | 5/2007 | Mekyska | |
| 2007/0129892 A1 | 6/2007 | Smartt et al. | |
| 2007/0179975 A1 | 8/2007 | Teh et al. | |
| 2007/0198317 A1 | 8/2007 | Harthcryde et al. | |
| 2007/0198982 A1* | 8/2007 | Bolan et al. | 718/104 |
| 2007/0214413 A1 | 9/2007 | Boeckenhauer | |
| 2007/0226064 A1 | 9/2007 | Yu et al. | |
| 2007/0226090 A1 | 9/2007 | Stratton | |
| 2007/0233439 A1 | 10/2007 | Carroll et al. | |
| 2007/0260532 A1 | 11/2007 | Blake, III | |
| 2007/0265896 A1 | 11/2007 | Smith | |
| 2007/0271203 A1 | 11/2007 | Delvat | |
| 2007/0276755 A1 | 11/2007 | Rapp | |
| 2007/0282626 A1 | 12/2007 | Zhang et al. | |
| 2008/0027957 A1 | 1/2008 | Bruckner et al. | |
| 2008/0033774 A1 | 2/2008 | Kimbrel et al. | |
| 2008/0059945 A1 | 3/2008 | Sauer et al. | |
| 2008/0060058 A1 | 3/2008 | Shea et al. | |
| 2008/0065435 A1 | 3/2008 | Ratzloff | |
| 2008/0071844 A1 | 3/2008 | Gopal et al. | |
| 2008/0082186 A1 | 4/2008 | Hood et al. | |
| 2008/0082435 A1 | 4/2008 | O'Brien et al. | |
| 2008/0120122 A1 | 5/2008 | Olenski et al. | |
| 2008/0201269 A1 | 8/2008 | Hollins et al. | |
| 2008/0201297 A1 | 8/2008 | Choi et al. | |
| 2008/0208647 A1 | 8/2008 | Hawley et al. | |
| 2008/0208667 A1 | 8/2008 | Lymbery et al. | |
| 2008/0222638 A1 | 9/2008 | Beaty et al. | |
| 2008/0239393 A1 | 10/2008 | Navon | |
| 2008/0255912 A1 | 10/2008 | Christiansen et al. | |
| 2008/0295096 A1 | 11/2008 | Beaty et al. | |
| 2008/0312979 A1 | 12/2008 | Lee et al. | |
| 2008/0319811 A1 | 12/2008 | Casey | |
| 2009/0012986 A1 | 1/2009 | Arazi et al. | |
| 2009/0013325 A1 | 1/2009 | Kobayashi et al. | |
| 2009/0018880 A1 | 1/2009 | Bailey et al. | |
| 2009/0063251 A1 | 3/2009 | Rangarajan et al. | |
| 2009/0063540 A1 | 3/2009 | Mattox et al. | |
| 2009/0100017 A1 | 4/2009 | Graves et al. | |
| 2009/0100406 A1 | 4/2009 | Greenfield et al. | |
| 2009/0144120 A1 | 6/2009 | Ramachandran | |
| 2009/0150396 A1 | 6/2009 | Elisha et al. | |
| 2009/0195350 A1 | 6/2009 | Tsern et al. | |
| 2009/0198535 A1 | 8/2009 | Brown et al. | |
| 2009/0199192 A1* | 8/2009 | Laithwaite | G06Q 10/109 718/104 |
| 2009/0210275 A1 | 8/2009 | Andreev et al. | |
| 2009/0216580 A1 | 8/2009 | Bailey et al. | |
| 2009/0234892 A1 | 9/2009 | Anglin et al. | |
| 2009/0300173 A1 | 12/2009 | Bakman et al. | |
| 2009/0319316 A1 | 12/2009 | Westerfeld et al. | |
| 2010/0005014 A1 | 1/2010 | Castle et al. | |
| 2010/0005173 A1 | 1/2010 | Baskaran et al. | |
| 2010/0017344 A1 | 1/2010 | Hambrecht et al. | |
| 2010/0042455 A1* | 2/2010 | Liu et al. | 705/8 |
| 2010/0049494 A1 | 2/2010 | Radibratovic et al. | |
| 2010/0082380 A1 | 4/2010 | Merrifield, Jr. et al. | |
| 2010/0094740 A1 | 4/2010 | Richter | |
| 2010/0125473 A1 | 5/2010 | Tung et al. | |
| 2010/0153282 A1 | 6/2010 | Graham | |
| 2010/0161371 A1 | 6/2010 | Cantor et al. | |
| 2010/0161634 A1 | 6/2010 | Caceres | |
| 2010/0169477 A1 | 7/2010 | Stienhans et al. | |
| 2010/0185557 A1 | 7/2010 | Hunter et al. | |
| 2010/0198750 A1 | 8/2010 | Ron et al. | |
| 2010/0211667 A1 | 8/2010 | O'Connell, Jr. | |
| 2010/0250419 A1* | 9/2010 | Ariff et al. | 705/35 |
| 2010/0250421 A1* | 9/2010 | Ariff et al. | 705/35 |
| 2010/0250642 A1 | 9/2010 | Yellin et al. | |
| 2010/0293163 A1 | 11/2010 | McLachlan et al. | |
| 2010/0299233 A1 | 11/2010 | Licardi et al. | |
| 2010/0306382 A1 | 12/2010 | Cardosa et al. | |
| 2010/0323754 A1 | 12/2010 | Nakagawa | |
| 2010/0325506 A1 | 12/2010 | Cai et al. | |
| 2010/0325606 A1 | 12/2010 | Sundararajan et al. | |
| 2010/0332262 A1 | 12/2010 | Horvitz et al. | |
| 2010/0333109 A1 | 12/2010 | Milnor | |
| 2011/0016214 A1 | 1/2011 | Jackson | |
| 2011/0016448 A1 | 1/2011 | Bauder et al. | |
| 2011/0022861 A1 | 1/2011 | Agneeswaran et al. | |
| 2011/0066472 A1 | 3/2011 | Scheider | |
| 2011/0066628 A1 | 3/2011 | Jayaraman | |
| 2011/0072340 A1 | 3/2011 | Miller | |
| 2011/0106691 A1 | 5/2011 | Clark et al. | |
| 2011/0107254 A1 | 5/2011 | Moroze | |
| 2011/0167034 A1* | 7/2011 | Knight et al. | 707/602 |
| 2011/0196795 A1 | 8/2011 | Pointer | |
| 2011/0225277 A1 | 9/2011 | Freimuth et al. | |
| 2011/0295766 A1 | 12/2011 | Tompkins | |
| 2011/0313947 A1 | 12/2011 | Grohovaz | |
| 2012/0016811 A1 | 1/2012 | Jones | |
| 2012/0023170 A1 | 1/2012 | Matignon et al. | |
| 2012/0066020 A1 | 3/2012 | Moon et al. | |
| 2012/0116990 A1 | 5/2012 | Huang | |
| 2012/0131591 A1 | 5/2012 | Moorthi et al. | |
| 2012/0150736 A1 | 6/2012 | Dickerson et al. | |
| 2012/0185368 A1 | 7/2012 | Schloter et al. | |
| 2012/0232947 A1 | 9/2012 | McLachlan | |
| 2012/0233217 A1 | 9/2012 | Purpus et al. | |
| 2012/0233547 A1 | 9/2012 | McLachlan | |
| 2012/0239739 A1 | 9/2012 | Manglik et al. | |
| 2012/0246046 A1 | 9/2012 | Hirsch | |
| 2012/0272234 A1 | 10/2012 | Kaiser et al. | |
| 2012/0330869 A1 | 12/2012 | Durham | |
| 2013/0028537 A1 | 1/2013 | Miyake et al. | |
| 2013/0041819 A1* | 2/2013 | Khasho | 705/42 |
| 2013/0060595 A1 | 3/2013 | Bailey | |
| 2013/0066866 A1 | 3/2013 | Chan et al. | |
| 2013/0091456 A1 | 4/2013 | Sherman et al. | |
| 2013/0091465 A1 | 4/2013 | Kikin-Gil et al. | |
| 2013/0103369 A1 | 4/2013 | Huynh et al. | |
| 2013/0103654 A1 | 4/2013 | McLachlan et al. | |
| 2013/0124454 A1 | 5/2013 | Bhide et al. | |
| 2013/0124459 A1 | 5/2013 | Iwase et al. | |
| 2013/0138470 A1 | 5/2013 | Goyal et al. | |
| 2013/0173159 A1 | 7/2013 | Trum et al. | |
| 2013/0179371 A1 | 7/2013 | Jain et al. | |

(56) References Cited

U.S. PATENT DOCUMENTS

| | | |
|---|---|---|
| 2013/0201193 A1 | 8/2013 | McLachlan et al. |
| 2013/0227584 A1 | 8/2013 | Greene et al. |
| 2013/0268307 A1 | 10/2013 | Li et al. |
| 2013/0282537 A1 | 10/2013 | Snider |
| 2013/0290470 A1 | 10/2013 | CaraDonna et al. |
| 2013/0293551 A1 | 11/2013 | Erez et al. |
| 2013/0339274 A1 | 12/2013 | Willis et al. |
| 2013/0346390 A1 | 12/2013 | Jerzak et al. |
| 2014/0006085 A1 | 1/2014 | McLachlan et al. |
| 2014/0006222 A1 | 1/2014 | Hericks et al. |
| 2014/0067632 A1 | 3/2014 | Curtis |
| 2014/0075004 A1 | 3/2014 | Van Dusen et al. |
| 2014/0089509 A1 | 3/2014 | Akolkar et al. |
| 2014/0122374 A1 | 5/2014 | Hacigumus et al. |
| 2014/0129583 A1 | 5/2014 | Munkes et al. |
| 2014/0136295 A1 | 5/2014 | Wasser |
| 2014/0143175 A1 | 5/2014 | Greenshields et al. |
| 2014/0172918 A1 | 6/2014 | Kornmann et al. |
| 2014/0229212 A1 | 8/2014 | MacElheron et al. |
| 2014/0244364 A1 | 8/2014 | Evers et al. |
| 2014/0252095 A1 | 9/2014 | Kikin |
| 2014/0257928 A1 | 9/2014 | Chen et al. |
| 2014/0278459 A1 | 9/2014 | Morris |
| 2014/0279121 A1 | 9/2014 | George et al. |
| 2014/0279201 A1 | 9/2014 | Iyoob et al. |
| 2014/0279676 A1 | 9/2014 | Schafer et al. |
| 2014/0279947 A1 | 9/2014 | Chachra et al. |
| 2014/0288987 A1 | 9/2014 | Liu |
| 2014/0310233 A1 | 10/2014 | Catalano et al. |
| 2014/0351166 A1 | 11/2014 | Schlossberg |
| 2014/0365503 A1 | 12/2014 | Franceschini et al. |
| 2014/0365504 A1 | 12/2014 | Franceschini et al. |
| 2015/0006552 A1 | 1/2015 | Lord |
| 2015/0012328 A1 | 1/2015 | McLachlan et al. |
| 2015/0066808 A1 | 3/2015 | Legare et al. |
| 2015/0074075 A1 | 3/2015 | Alexander |
| 2015/0088584 A1 | 3/2015 | Santiago, III et al. |
| 2015/0227991 A1 | 8/2015 | Yu |
| 2015/0294273 A1 | 10/2015 | Barraci et al. |
| 2015/0302303 A1 | 10/2015 | Hakim |
| 2015/0341230 A1 | 11/2015 | Dave et al. |
| 2015/0363725 A1 | 12/2015 | Anderson et al. |
| 2015/0379061 A1 | 12/2015 | Paraschivescu |
| 2016/0063577 A1 | 3/2016 | Yellin et al. |
| 2017/0102246 A1 | 4/2017 | Yang |
| 2018/0068246 A1 | 3/2018 | Crivat et al. |

OTHER PUBLICATIONS

Lebas, Michel J. ("Performance measurement and performance management." International journal of production economics 41.1 (1995): 23-35).*

"Notice from the European Patent Office dated Oct. 1, 2007 concerning business methods," Official Journal EPO, Nov. 2007, pp. 592-593.

"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.

"Project Management," Wikipedia, the free encyclopedia, accessed Mar. 13, 2012, 14 pages http://en.wikipedia.org/wiki/Project_management—last modified Mar. 7, 2012.

Extended European Search Report in EP Application No. 13151967.0-1955, dated Apr. 19, 2013.

International Search Report and Written Opinion for International Patent Application No. PCT/US2010/035021 dated Jul. 14, 2010.

International Preliminary Report on Patentability for International Patent Application No. PCT/US2010/035021 dated Nov. 24, 2011.

International Search Report and Written Opinion for International Patent Application No. PCT/US2012/028353 dated Oct. 31, 2012.

International Search Report and Written Opinion for International Patent Application No. PCT/US2012/028378 dated Sep. 12, 2012.

Official Communication for U.S. Appl. No. 12/467,120 dated Oct. 4, 2011.

Official Communication for U.S. Appl. No. 12/467,120 dated Jun. 20, 2012.

Official Communication for U.S. Appl. No. 12/467,120 dated Aug. 29, 2012.

Official Communication for U.S. Appl. No. 12/467,120 dated Mar. 26, 2013.

Official Communication for U.S. Appl. No. 13/324,253 dated Sep. 25, 2012.

Official Communication for U.S. Appl. No. 13/324,253 dated Jan. 10, 2013.

Official Communication for U.S. Appl. No. 13/324,253 dated Mar. 19, 2013.

Official Communication for U.S. Appl. No. 13/452,628 dated Apr. 22, 2013.

"Activity Based Costing is the best allocation methodology," APPTIO, Community for Technology Business Management, Mar. 16, 2010, 2 pages.

"Amazon Elastic Computer Cloud (Amazon EC2)", archive.org, Oct. 21, 2011, 9 pages http://web.archive.org/web/20111029130914/http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#.Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-fronn-apptio-tracks-cloud-service-provider-pricing.html.

International Preliminary Report on Patentability for International Patent Application No. PCT/US2012/028353 dated Sep. 19, 2013.

International Preliminary Report on Patentability for International Patent Application No. PCT/US2012/028378 dated Sep. 19, 2013.

Official Communication for U.S. Appl. No. 12/467,120 dated Oct. 23, 2013.

Official Communication for U.S. Appl. No. 13/324,253 dated Sep. 6, 2013.

Official Communication for U.S. Appl. No. 13/415,797 dated Oct. 3, 2013.

(56) References Cited

OTHER PUBLICATIONS

Official Communication for U.S. Appl. No. 13/452,628 dated Nov. 18, 2013.
Official Communication for U.S. Appl. No. 13/675,837 dated Oct. 10, 2013.
Official Communication for U.S. Appl. No. 13/837,815 dated Oct. 23, 2013.
Official Communication for U.S. Appl. No. 13/917,478 dated Nov. 7, 2013.
Official Communication for U.S. Appl. No. 13/917,503 dated Oct. 10, 2013.
Official Communication for U.S. Appl. No. 13/324,253 dated Jan. 23, 2014.
Official Communication for U.S. Appl. No. 13/675,837 dated Jan. 31, 2014.
Official Communication for U.S. Appl. No. 13/917,503 dated Jan. 31, 2014.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010 open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?
Cost Optimisation with Amazon Web Services, extracted slides, Slideshare Jan. 30, 2012 http://www.slideshare.net/AmazonWebServices/cost-optimisation-with-amazon-web-setvices?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/837,815 dated Apr. 27, 2015.
Office Communication for U.S. Appl. No. 13/452,628 dated Jun. 23, 2015.
SAS Activity-Based Management, 2010, Fact Sheet, 4 pages.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
European Search Report for Application No. 12755613.2 dated Jan. 26. 2015 (6 pages).
Office Communication for U.S. Appl. No. 13/452,628 dated Mar. 30, 2015 (18 pages).
Office Communication for U.S. Appl. No. 14/180,308 dated Apr. 17, 2015 (8 pages).
Office Communication for U.S. Appl. No. 13/917,503 dated Apr. 16, 2015 (19 pages).
Office Communication for U.S. Appl. No. 13/675,837 dated Apr. 16, 2015 (19 pages).
Office Communication for U.S. Appl. No. 13/415,797 dated Oct. 19, 2015.
Office Communication for U.S. Appl. No. 13/837,815 dated Sep. 28, 2015.
Office Communication for U.S. Appl. No. 13/649,019 dated Sep. 23, 2015.
Office Communication for U.S. Appl. No. 13/365,150 dated Sep. 24, 2015.
Office Communication for U.S. Appl. No. 14/033,130 dated Sep. 15. 2015.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 14/867,552, dated Apr. 25, 2016, 12 pages.
Office Communication for U.S. Appl. No. 14/033,130, dated Apr. 25, 2016, 5 pages.
Office Communication for U.S. Appl. No. 14/971,944, dated May 19, 2016, 17 pages.
Official Communication for U.S. Appl. No. 14/033,130 dated Feb. 18, 2016, 22 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.
Official Communication for U.S. Appl. No. 14/981,747 dated Jul. 14, 2016, 29 pages.
Stephen Muller and Hasso Platner, "An IN-Depth Analysis of Data Aggregation Cost Factors in a Columnar In-Memory Database", ACM DOLAP'12, Nov. 2, 2012, Maui, Hawaii, USA, pp. 65-72.
Official Communication for U.S. Appl. No. 14/869,721 dated Jun. 1, 2016, 35 pages.
Official Communication for U.S. Appl. No. 14/977,368 dated Jun. 7, 2016, 11 pages.
Official Communication for U.S. Appl. No. 14/846,349 dated Jul. 1, 2016, 24 pages.
Official Communication for U.S. Appl. No. 14/867,552 dated Oct. 3, 2016, 19 pages.
Official Communication for U.S. Appl. No. 14/180,308 dated Oct. 19, 2016, 22 pages.
Official Communication for U.S. Appl. No. 14/977,368 dated Oct. 19, 2016, 5 pages.
Official Communication for U.S. Appl. No. 13/365,150 dated Oct. 24, 2016, 19 pages.
Office Communication for U.S. Appl. No. 13/415,797 dated Oct. 19, 2015, 3 pages.
Office Communication for U.S. Appl. No. 13/837,815 dated Sep. 28, 2015, 20 pages.
European Examination Report for Application No. 14159413.5 dated Jul. 15, 2015, 9 pages.
Office Communication for U.S. Appl. No. 13/415,701 dated Oct. 27, 2015, 16 pages.
Office Communication for U.S. Appl. No. 13/365,150 dated Dec. 7, 2015, 3 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Chien-Liang Fok et al., "Rapid Development and Flexible Deployment of Adaptive Wireless Sensor Network Applications," Proceed-

(56) References Cited

OTHER PUBLICATIONS ings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
Official Communication for U.S. Appl. No. 13/649,019 dated Jan. 4, 2016, 8 pages.
Official Communication for U.S. Appl. No. 14/869,721 dated Jan. 13, 2016, 57 pages.
Official Communication for U.S. Appl. No. 13/452,628 dated Jan. 12, 2016, 21 pages.
Official Communication for U.S. Appl. No. 13/637,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Official Communication for U.S. Appl. No. 13/415,797 dated Jan. 11, 2017, 25 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.
Official Communication for U.S. Appl. No. 15/351,313 dated Jan. 12, 2017, 7 pages.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 14/981,747 dated May 19, 2017, 43 pages.
Official Communication for U.S. Appl. No. 15/271,013 dated May 24, 2017, 37 pages.
Official Communication for U.S. Appl. No. 14/180,308 dated May 25, 2017, 21 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.
Official Communication for U.S. Appl. No. 15/351,313 dated Jul. 18, 2017, 15 pages.
Official Communication for U.S. Appl. No. 15/260,221 dated Aug. 15, 2017, 21 pages.
Official Communication for U.S. Appl. No. 13/365,150 dated Aug. 23, 2017, 30 pages.
Official Communication for U.S. Appl. No. 15/379,267 dated Jun. 30, 2017; 16 pages.
Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 15/379,267 dated Mar. 10, 2017, 11 pages.
Official Communication for U.S. Appl. No. 13/415,797 dated Apr. 14, 2017, 3 pages.
Official Communication for U.S. Appl. No. 14/180,308 dated Feb. 8, 2017, 3 pages.
Official Communication for U.S. Appl. No. 14/846,349 dated Mar. 1, 2017, 27 pages.
Official Communication for U.S. Appl. No. 13/452,628 dated Mar. 9, 2017, 24 pages.
Official Communication for U.S. Appl. No. 13/365,150 dated Mar. 15, 2017, 19 pages.
Official Communication for U.S. Appl. No. 14/867,552 dated Nov. 29, 2017, 12 pages.
Official Communication for U.S. Appl. No. 14/981,747 dated Dec. 12, 2017, 44 pages.
Official Communication for U.S. Appl. No. 14/033,130 dated Dec. 20, 2017, 12 pages.
Official Communication for U.S. Appl. No. 14/180,308 dated Dec. 22, 2017, 18 pages.
Official Communication for U.S. Appl. No. 15/271,013 dated Dec. 27, 2017, 35 pages.
Official Communication for U.S. Appl. No. 15/260,221 dated Jan. 9, 2018, 21 pages.
Official Communication for U.S. Appl. No. 15/379,267 dated Jan. 2, 2018, 15 pages.
Official Communication for U.S. Appl. No. 15/351,313 dated Jan. 8, 2018, 11 pages.
Official Communication for U.S. Appl. No. 14/846,349 dated Jan. 16, 2016, 29 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
Official Communication for U.S. Appl. No. 15/859,008 dated Mar. 5, 2018, 20 pages.
Official Communication for U.S. Appl. No. 14/846,349 dated Nov. 20, 2017, 3 pages.
Official Communication for U.S. Appl. No. 13/917,503 dated Nov. 28, 2017, 26 pages.
Official Communication for U.S. Appl. No. 13/837,815 dated Jan. 26, 2018, 12 pages.
Official Communication for U.S. Appl. No. 14/667,552 dated Feb. 13, 2018, 3 pages.
Official Communication for U.S. Appl. No. 14/869,721 dated Jan. 19. 2018, 3 pages.
Official Communication for U.S. Appl. No. 13/917,503 dated Jul. 19, 2018, pp. 1-3.
Official Communication for U.S. Appl. No. 14/846,349 dated Jul. 20, 2018, pp. 1-40.
Official Communication for U.S. Appl. No. 14/981,747 dated Jul. 5, 2018, pp. 1-62.
Official Communication for U.S. Appl. No. 15/271,013 dated Jul. 6, 2018, pp. 1-49.
Official Communication for U.S. Appl. No. 15/379,267 dated Jul. 19, 2018, pp. 1-34.
Official Communication for U.S. Appl. No. 15/659,058 dated May 14, 2018, pp. 1-76.
Official Communication for U.S. Appl. No. 14/033,130 dated Aug. 9, 2018, pp. 1-47.

(56) References Cited

OTHER PUBLICATIONS

Official Communication for U.S. Appl. No. 14/180,308 dated Aug. 6, 2018, pp. 1-23.
Official Communication for U.S. Appl. No. 15/858,945 dated Sep. 10, 2018, pp. 1-25.
Official Communication for U.S. Appl. No. 15/858,008 dated Jul. 31, 2018, pp. 1-28.
Official Communication for U.S. Appl. No. 13/917,503 dated Nov. 20, 2018, pp. 1-55.
Official Communication for U.S. Appl. No. 14/869,721 dated Oct. 11, 2018, pp. 1-73.
Official Communication for U.S. Appl. No. 14/867,552 dated Nov. 21, 2018, pp. 1-37.
Official Communication for U.S. Appl. No. 15/260,221 dated Oct. 5, 2018, pp. 1-40.
Official Communication for U.S. Appl. No. 15/379,267 dated Oct. 18, 2018, pp. 1-9.
Official Communication for U.S. Appl. No. 15/859,058 dated Dec. 5, 2018, pp. 1-20.
Official Communication for U.S. Appl. No. 14/033,130 dated Dec. 18, 2018, pp. 1-11.
Official Communication for U.S. Appl. No. 15/271,013 dated Dec. 18, 2018, pp. 1-47.
Official Communication for U.S. Appl. No. 14/033,130 dated Dec. 16, 2013.
Extended European Search Report in EP Application No. 14159413.5 dated Jul. 4, 2014.
Office Communication for U.S. Appl. No. 13/452,628 dated Mar. 13, 2014.
Office Communication for U.S. Appl. No. 14/180,308 dated Apr. 8, 2014.
Office Communication for U.S. Appl. No. 14/180,308 dated Sep. 2, 2014.
Office Communication for U.S. Appl. No. 14/033,130 dated Aug. 5, 2014.
Office Communication for U.S. Appl. No. 14/033,130 dated May 27, 2014.
Office Communication for U.S. Appl. No. 13/324,253 dated Apr. 9, 2014.
Office Communication for U.S. Appl. No. 13/324,253 dated Oct. 24, 2014.
Office Communication for U.S. Appl. No. 13/675,837 dated Jan. 31, 2014.
Office Communication for U.S. Appl. No. 13/415,797 dated Apr. 9, 2014.
Office Communication for U.S. Appl. No. 13/917,503 dated Apr. 3, 2014.
Office Communication for U.S. Appl. No. 14/180,308 dated Jan. 30, 2015.
Office Communication for U.S. Appl. No. 13/365,150 dated Dec. 3, 2014.
Office Communication for U.S. Appl. No. 13/452,628 dated Oct. 1, 2014.
Office Communication for U.S. Appl. No. 13/415,797 dated Jan. 12, 2015.
Office Communication for U.S. Appl. No. 13/837,815 dated Apr. 7, 2014.
Office Communication for U.S. Appl. No. 13/675,837 dated Apr. 2, 2014.
Office Communication for U.S. Appl. No. 13/837,815 dated Sep. 25, 2014.
Office Communication for U.S. Appl. No. 13/324,253 dated Feb. 19, 2015.
Office Communication for U.S. Appl. No. 13/649,019 dated Feb. 10, 2015.
Office Communication for U.S. Appl. No. 13/415,797 dated Jul. 23, 2015.
International Search Report and Written Opinion for PCT/US2015/015486 dated Jun. 29, 2015.
Official Communication for European Application No. 13151967.0 dated Aug. 18, 2017.
European Search Report for Application No. 10775648.8 dated Mar. 10, 2017.
Official Communication for European Application No. 12755613.2 dated Aug. 17, 2017.
Official Communication for U.S. Appl. No. 14/033,130 dated Sep. 7, 2017.
Official Communication for U.S. Appl. No. 14/846,349 date Sep. 8, 2017.
Official Communication for U.S. Appl. No. 13/452,628 dated Sep. 28, 2017.
Official Communication for U.S. Appl. No. 13/837,815 dated Sep. 28, 2017.
Official Communication for U.S. Appl. No. 13/415,797 dated Sep. 7, 2017.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 14/869,721 dated May 11, 2018, pp. 1-33.
Official Communication for U.S. Appl. No. 14/867,552 dated May 31, 2018, pp. 1-22.
Official Communication for U.S. Appl. No. 15/351,313 dated Jun. 4, 2018, pp. 1-9.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 14/867,552 dated Nov. 29, 2017.
Official Communication for U.S. Appl. No. 14/981,747 dated Dec. 12, 2017.
Official Communication for U.S. Appl. No. 14/033,130 dated Dec. 20, 2017.
Official Communication for U.S. Appl. No. 14/180,308 dated Dec. 22, 2017.
Official Communication for U.S. Appl. No. 15/271,013 dated Dec. 27, 2017.
Official Communication for U.S. Appl. No. 15/260,221 dated Jan. 9, 2018.
Official Communication for U.S. Appl. No. 15/379,267 dated Jan. 2, 2018.
Official Communication for U.S. Appl. No. 15/351,313 dated Jan. 8, 2018.
Official Communication for U.S. Appl. No. 14/846,349 dated Jan. 18, 2018.
Official Communication for U.S. Appl. No. 14/869,721 dated Oct. 17, 2017.
Official Communication for U.S. Appl. No. 15/379,267 dated Oct. 6, 2017.
Official Communication for U.S. Appl. No. 15/859,008 dated Mar. 5, 2018.
Official Communication for U.S. Appl. No. 14/846,349 dated Nov. 20, 2017.
Official Communication for U.S. Appl. No. 13/917,503 dated Nov. 28, 2017.
Official Communication for U.S. Appl. No. 13/837,815 dated Jan. 26, 2018.
Official Communication for U.S. Appl. No. 14/869,721 dated Jan. 19, 2018.
Official Communication for U.S. Appl. No. 14/867,552 dated Feb. 13, 2018.

* cited by examiner

RECURSIVE PROCESSING OF OBJECT ALLOCATION RULES

TECHNICAL FIELD

The present invention relates generally to computer automated activity based budget modeling, forecasting and cost accounting, and more particularly, but not exclusively to efficiently processing object allocation rules.

BACKGROUND

Businesses that strive to remain viable and successful in today's competitive commercial environment are required to adopt accurate and responsive budgeting practices. To improve efficiency, businesses use financial models that apply modern budgeting, forecasting and cost accounting techniques. For some accounting techniques, the complexity of the financial allocation model may increase as the number of tracked activities and elements increases. Therefore, for larger enterprises, sophisticated computer programs and computing devices are often required to assist in generating useful and relevant budgets based on financial allocation models.

In some cases, the large number of items and entities required for financial modeling can make development of modeling applications difficult. Further, the size and complexity of modern financial allocation models can make it difficult to design allocation rules for the cost allocations between groups and/or items within the model. Historically, the size and complexity of these financial allocation models have made it difficult to accurately ascertain a total cost of ownership for an offering such as a product and/or service. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein.

DESCRIPTION OF THE VARIOUS EMBODIMENTS

Figure 1:
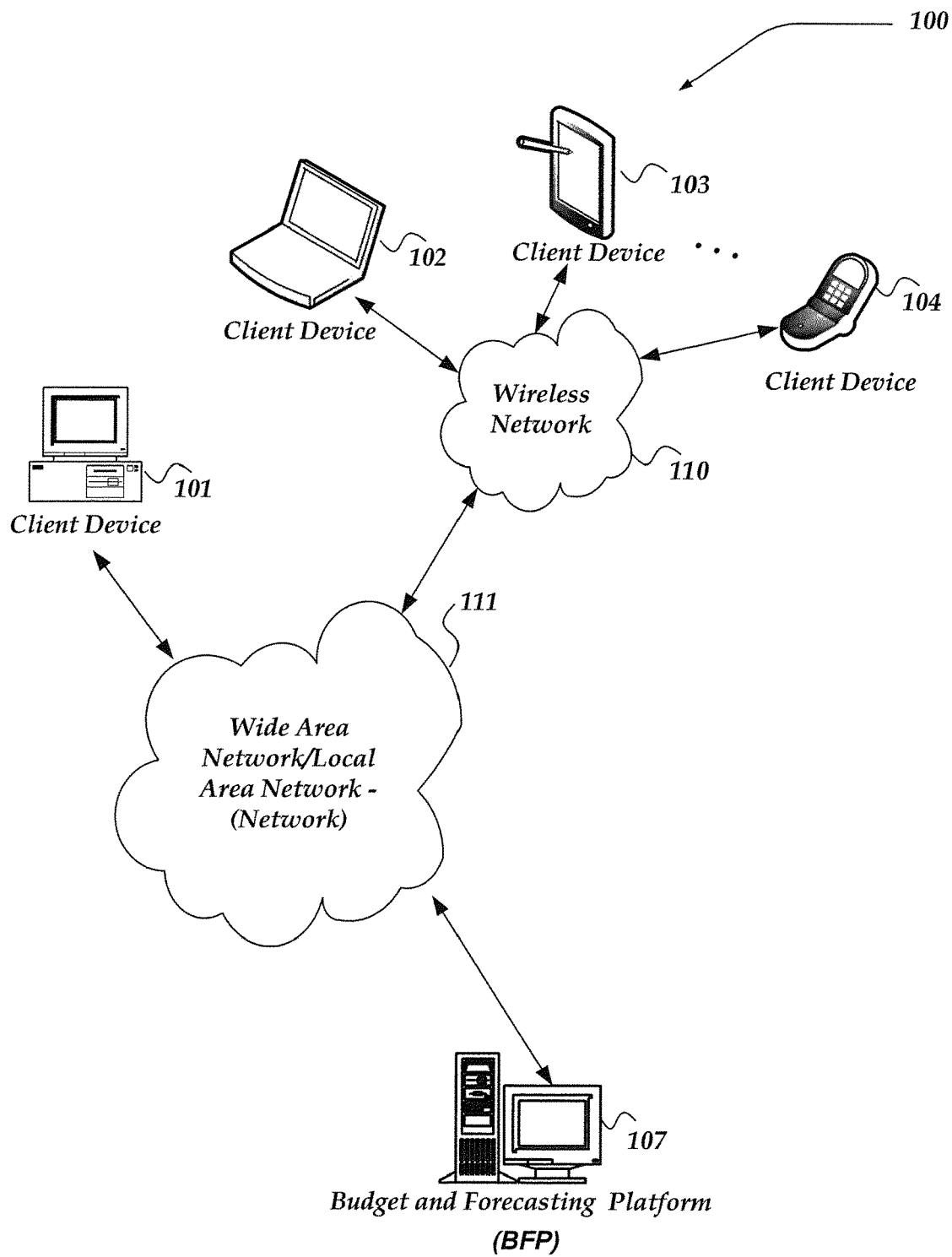
FIG. 1 illustrates a system diagram showing components of an environment in which at least one of the various embodiments may be practiced.

The present invention now will be described more folly hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "Financial allocation model," "data model", and "cost model" refers to a graph based representation of a system of financial allocation rules that can be used for costing actual expenditures (for management accounting) or budgeting future expenditures. Nodes in the model may represent classes of items that may be associated with costs and/or expenses. The edges of the graph may represent how the costs and/or expenses may be allocated between the nodes. A financial allocation model may be a visual rendering of a graph showing the nodes and the edges connecting the nodes.

As used herein, the term "Cost line item," refers to a single line item in a budget (or finance allocation model) and its associated cost/expense. For example, the costs associated with a particular computer that is an email server may be a single item having a particular cost (e.g., the email server may correspond to a cost line item).

As used herein, the term "Category," refers to a set and/or class of cost line items that may be grouped together. Also, dataset information in fields of a dataset template may be mapped to one or more categories in a category template. For example, a collection of computers performing services such as email, web serving, enterprise resource planning, may represent separate cost line items and they may be grouped into the Servers category.

As used herein, the terms "Allocation rules," "entity propagation rules," or "propagation rules" refer to rules in the financial data model that determine how the costs/expenses from a category are allocated between/among other categories. Also, such rules may be assigned to individual cost line items. For example, if an email server cost line item has a value of $1000 an allocation or entity propagation rule may be defined such that 50% of the expense may be allocated to the Marketing department and 50% may be allocated to the Engineering department. Also, allocation rules may be applied at the category as well as the cost line item level.

As used herein, the term "Assignment ratios," refers to an allocation rule, or the results of applying one or more rules, of the distribution ratio of costs to cost line items or categories. For example, if $1000 may be allocated to Servers category, and the cost line item Email Server is allocated $800 and the cost line item FTP Server is allocation $200, the assignment ratios may be determined to 80% to budget item line Email Server and 20% to cost line item FTP Server. Assignment ratios may be explicitly defined by allocation rules. Or they may be derived from the allocation tables by converting the values into ratios of the total allocation to the category.

As used herein, the terms "business system" and/or "generated business system," refers to a system that has been generated using the budget and forecasting platform. Various embodiments disclosed herein may be related to financial applications. But, one of ordinary skill the art will appreciate that generated business systems are not limited to financial applications.

As used herein, the term "external data source" refers to any separately located system that may enable and/or provide access to one or more datasets of information.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. Non-tabular datasets can also take the form of marked up strings of characters, such as an XML file.

As used herein, the term "offering" refers to any service, product, or combination of service(s) and/or product(s) that may be provided by a system.

As used herein, the term "total cost value" refers to a value that is determined for providing at least one offering. A model for determining the total cost value of the at least one offering is based at least on an allocation of cost data to at least one category in a category template.

As used herein, the term "source object" refers to an object in a financial data model that may be providing values (e.g., costs/expenses) that may be allocated to one or more other objects (target objects). In at least one of the various embodiments, source objects may be used to represent one or more categories in a data model.

As used herein, the term "target object" refers to an object in a financial data model that may be allocated values (e.g., costs/expenses) from one or more other objects (source objects). In at least one of the various embodiments, target objects may be used to represent one or more categories in a data model.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards allocating costs for a plurality of cost objects. In at least one of the various embodiments, a source object and a target object in a data model may be determined such that an allocation rule is used to define one or more cost allocations where the costs flow from the source object to the target object.

In at least one of the various embodiments, the allocation rule may be executed on the source object and the target object until a terminal condition is met. The allocation rule may be employed to generate a cost value for the target object based on the cost value that corresponds to the source object. The cost value that corresponds to the source object may be modified based on the allocation rule and the generated cost value. This process may continue until a terminal condition is met. After the terminal condition has been met, a final cost value that corresponds to the target object may be generated based on the cost value and the allocation rule. And, another final cost value that corresponds to the source object may be generated based on the other cost value and the allocation rule. In at least one of the various embodiments, the two generated final values may be displayed in user-interface representation of the data model.

In at least one of the various embodiments, the terminal condition that ends the recursive allocation may be met if a defined number of iterations is met or exceeded, or if a monitored value falls below a defined threshold value.

In at least one of the various embodiments, the recursive allocation may include transition conditions that enable another allocation rule to be selected if the transition condition is met.

In at least one of the various embodiments, the recursive allocation rule may increment the source object cost value by a value defined by the allocation rule. In at least one of the various embodiments, the source object cost value may be modified by incrementing it an amount based on the last generated cost value that corresponds the target object.

In at least one of the various embodiments, recursive allocation rule may be arranged to add or subtract an offset value to the final cost value that corresponds to the source object, or the other final cost value that corresponds to the source object.

In at least one of the various embodiments, a recursive rule may be indicated in a user-interface by generating and displaying an emphasized connector leading from the target object to the source object.

In at least one of the various embodiments, in response to a drilldown search command in at least one of the various embodiments, may be arranged to generate one or more temporary cost objects in the data model based on the number of iterations in the recursive allocation rule. And, in at least one of the various embodiments, generate at least one temporary cost value between each temporary cost object based on the allocation rule. This expanding of the recursive rule may be a behind-the-scenes (relative to a user) operation that enables access to information that may otherwise be obscured by the operation of recursion. If the recursion is unwound, this information may be made available for other operations, such as, drilling down the data model to determine the details of where the costs/money allocated to a target object come from.

Illustrative Operating Environment

FIG. 1 shows components of one embodiment of an environment in which at least one of the various embodiments may be practiced. Not all the of components may be required to practice various embodiments, and variations in the arrangement and type of the components may be made. As shown, system 100 of FIG. 1 includes local area networks ("LANs")/wide area networks ("WANs")—(network) 111, wireless network 110, client devices 101-104, and Budget and Forecasting Platform (BFP) 107.

Generally, client devices 102-104 may include virtually any portable computing device capable of receiving and sending a message over a network, such as network 111, wireless network 110, or the like. Client devices 102-104 may also be described generally as client devices that are configured to be portable. Thus, client devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client devices 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client device 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client devices 102-104 may operate over wired and/or wireless network. Today, many of these devices include a capability to access and/or otherwise communicate over a network such as network 111 and/or wireless network 110. Moreover, client devices 102-104 may access various computing applications, including a browser, or other web-based application.

In at least one of the various embodiments, one or more of client devices 101-104 may be configured to operate within a business or other entity to perform a variety of services for the business or other entity. For example, client devices 101-104 may be configured to operate as a web server, an accounting server, a production server, an email server, video game server, an inventory server, or the like. However, client devices 101-104 are not constrained to these services and may also be employed, for example, as an end-user computing node, in other embodiments. Further, it should be recognized that more or less client devices may be included within a system such as described herein, and embodiments are therefore not constrained by the number or type of client devices employed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, or the like, to display and send a message. In at least one of the various embodiments, a user of the client device may employ the browser application to perform various actions over a network.

Client devices 101-104 also may include at least one other client application that is configured to receive and/or send data, including budgeting and forecasting information, between another computing device. Client applications may include a capability to provide requests and/or receive data relating to the cost models, budget reports, budget project information, allocation rules, or the like. The client application may provide data representing assignment and/or allocation changes, selecting templates, editing cost allocations between or among categories, generating and/or modifying recursive allocation rules, or the like. In at least one of the various embodiments, client applications may receive and/or generate data related to budgeting and financial models and may generate tables and relationships between and among the data. In at least one of the various embodiments, client devices 101-104 may view and/or modify generated data models.

Wireless network 110 is configured to couple client devices 102-104 and its components with network 111. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HS-DPA), Long Term Evolution (LTE), or the like. In essence, wireless network 110 may include virtually any wireless communication mechanism by which information may travel between client devices 102-104 and another computing device, network, or the like.

Network 111 is configured to couple network devices with other computing devices, including, BFP 107, client device(s) 101, and through wireless network 110 to client devices 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 2:
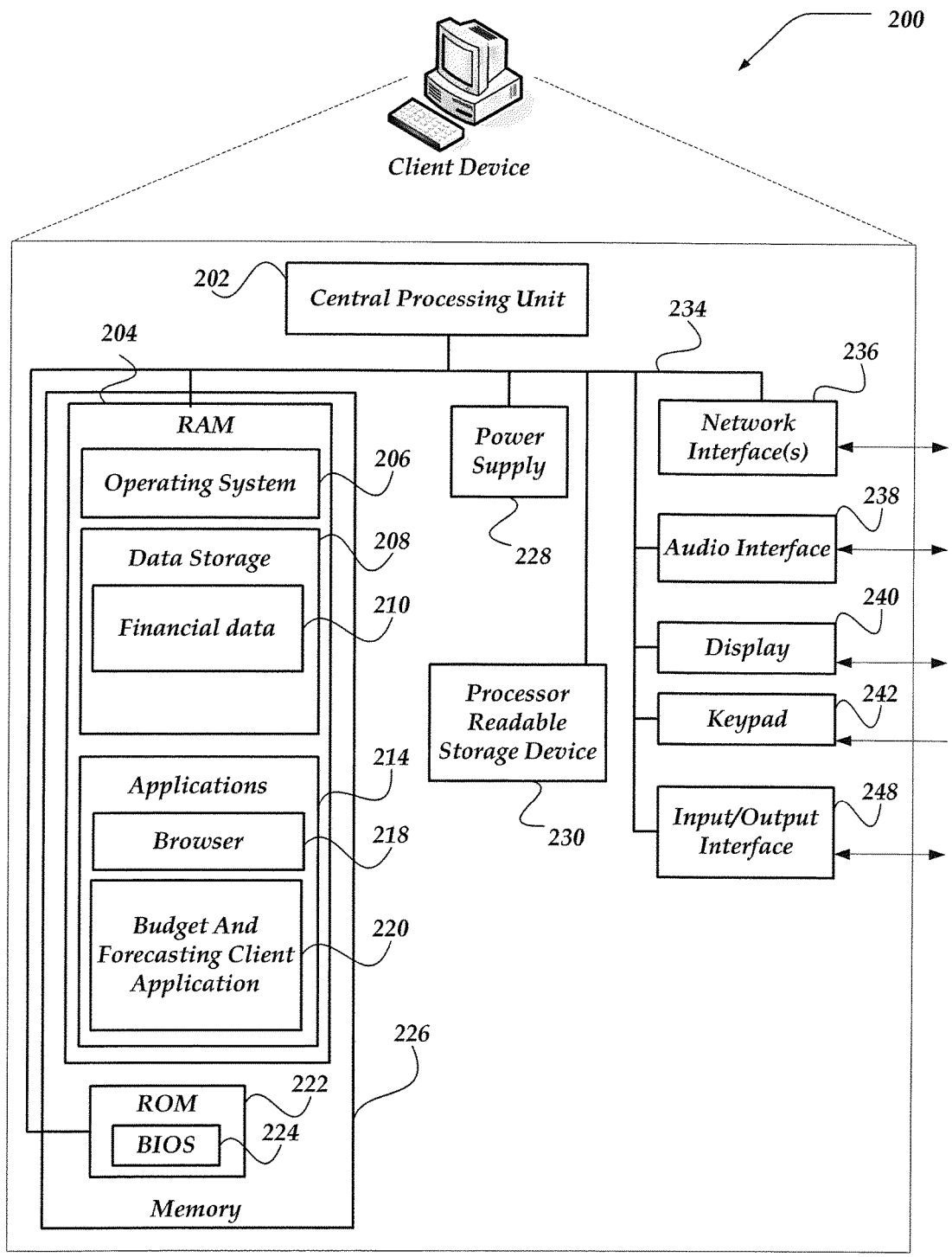
FIG. 2 shows one embodiment of a client device that may be included in a system.

BFP 107 may include virtually any network device usable to perform data processing operation that may be used for generating cost models, data models, allocation rules, recursive allocation rules, cost allocations, total cost values for offerings, displays and/or reports thereof, such as network device 200 of FIG. 2. In at least one of the various embodiments, BFP 107 employs various techniques to create, define, generate, and/or automated data processing applications such as budgeting and financial management applications and one or more cost models and/or data models. BFP 107 may include modules for generating data processing applications that may apply models that may include dataset templates, category templates, allocation rules, recursive allocation rules or the like. Furthermore, BFP 107 may include and/or generate data processing applications for visualizing the generated allocation categories, cost allocations, budgets, cost models, data models, allocation rules, recursive allocation rules, total cost values for offerings, or the like.

Devices that may operate as BFP 107 include various network devices, including, but not limited to personal computers, desktop computers, multiprocessor systems, microprocessor-based or programmable consumer electronics, network PCs, server devices, tablet computers, network appliances, or the like. It should be noted that while BFP 107 is illustrated as a single network device, the invention is not so limited. Thus, in another embodiment, BFP 107 may represent a plurality of network devices. For example, in at least one of the various embodiments, BFP 107 may be distributed over a plurality of network devices and/or implemented using cloud architecture.

Moreover, BFP 107 is not limited to a particular configuration. Rather, BFP 107 may operate using a controller/worker approach over a plurality of network devices, within a cluster, a peer-to-peer architecture, cloud-based architecture (e.g., virtual machines), and/or any of a variety of other architectures. Thus, BFP 107 is not to be construed as being limited to a single environment, and other configurations, and architectures are also envisaged. BFP 107 may employ processes and such as described below in conjunction with FIG. 4 and above to perform at least some of its actions.

Illustrative Client Device

FIG. 2 shows one embodiment of client device 200 that may be included in a system implementing at least one of the various embodiments. Client device 200 may include many more or less components than those shown in FIG. 2. However, the components shown are sufficient to disclose an illustrative embodiment for practicing the present invention. Client device 200 may represent, for example, one embodiment of at least one of client devices 101-104 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, and an input/output interface 248. Power supply 228 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, global system for mobile communication ("GSM"), code division multiple access ("CDMA"), time division multiple access ("TDMA"), LTE, HSDPA, user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("Wi-Max"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 may be arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), organic LED, electronic ink, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of Windows®, UNIX, or LINUX™, or a specialized client communication operating system such as Windows Mobile™, Google Android™, Apple iOS™, or the Symbian® operating system. The operating system may include, or interface with a Java virtual machine module, .Net Common Language Runtime, or the like, that enables control of hardware components and/or operating system operations via application programs using Java, .Net, or the like.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on a variety of events, including being sent as part of a header during a communication, sent upon request, or the like. At least a portion of the information may also be stored on a disk drive or other computer-readable storage device (not shown) within client device 200. Further, as illustrated, data storage 208 may also financial data 210. In some embodiments, financial data 210 may include a database, text, spreadsheet, folder, file, or the like, that may be configured to maintain and store various budget data, allocation rules, recursive allocation rules, audit logs, dataset templates, category templates, datasets, or the like. Such financial data 210 may also be stored within any of a variety of other computer-readable storage devices, including, but not limited to a hard drive, a portable storage device, or the like, such as illustrated by non-transitory computer-readable storage device 230. In yet other embodiments, data storage 208 may also store data associated with cost data models that may be generated in part by BFP 107. Furthermore, in at least one of the various embodiments, client device 200 may be arrange for providing information to network device 300 for generating one or more data models and displaying one or more reports related to the data models.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218 and budget and forecasting client application 220.

Browser 218 may include virtually any application configured to receive and display graphics, text, multimedia, and the like, employing virtually any web based language. In at least one of the various embodiments, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client device 200 to communicate with another network device, such as BFP 107 of FIG. 1. In one embodiment, browser 218 may enable a user to view and/or manipulate data models, budget projects, including creating budgets, modifying cost models, generating and/or updating recursive allocation rules, or the like.

In at least one of the various embodiments, a user may employ client device 200 to manage budgeting and finance applications, and to access information stored or otherwise managed through BFP 107. Also, in at least one of the various embodiments, the user may be enabled to perform a variety of actions on the data, including, queries, comparisons, summations, analysis, or the like. Additionally, in at least one of the various embodiments, a user may employ client 200 to automate one or more processes that may be used for generating business systems, cost models, budget projects, or the like. In at least one of the various embodiments, budget and forecasting client application 220 may be arranged to enable a user to rapidly generate business systems that include allocation rules, recursive allocation rules, cost values, cost models, data models, or the like. In at least one of the various embodiments, application 220 may be arranged to generate and render visualizations and display reports of allocation rules among cost categories in a cost model.

In any event, budget and forecasting client application 220 may employ processes similar to those described below and illustrated in FIG. 4 and above to perform at least some of its actions.

Illustrative Network Device

Figure 3:
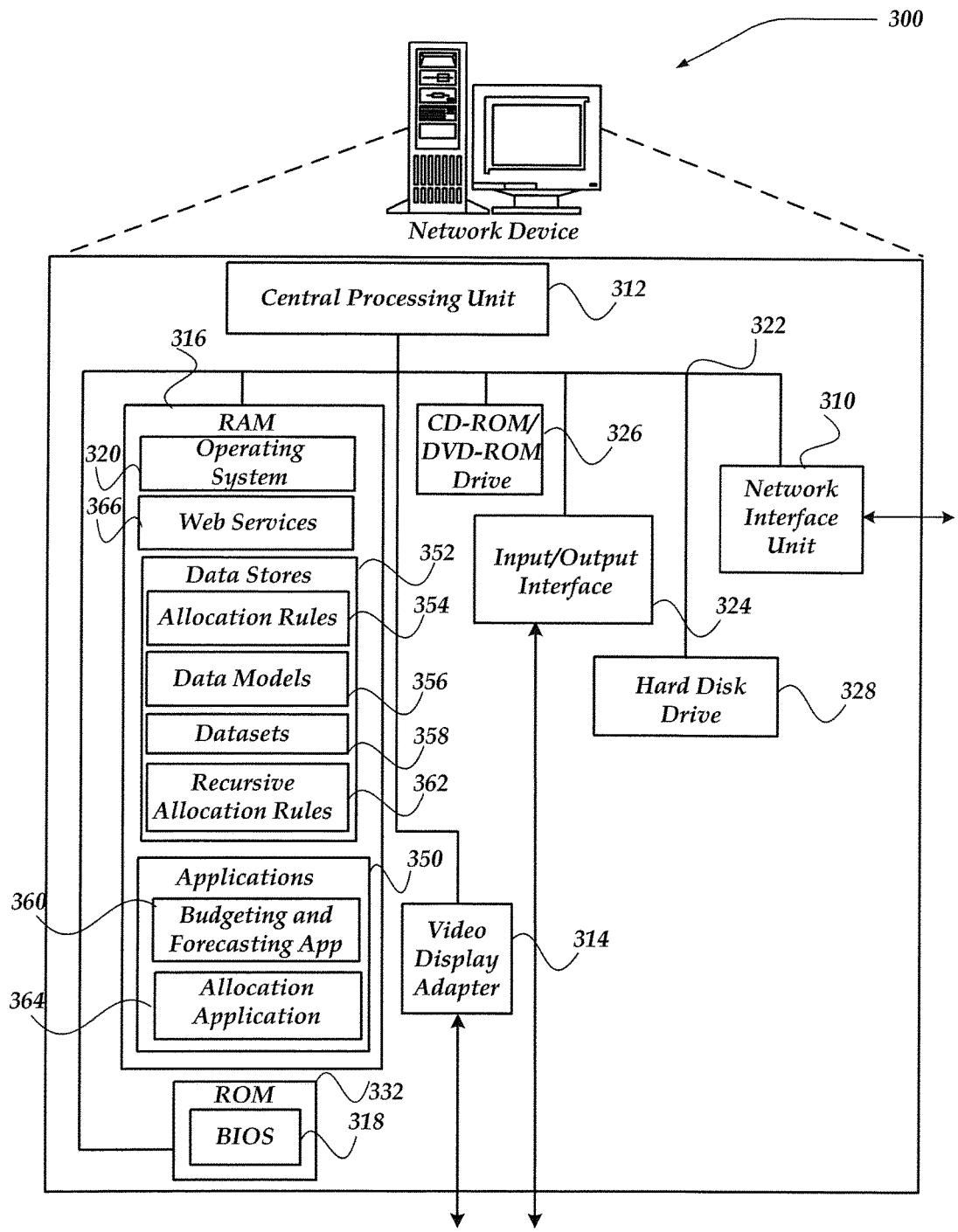
FIG. 3 illustrates one embodiment of a network device that may be included in a system.

FIG. 3 shows one embodiment of network device 300 that may be included in a system implementing at least one of the various embodiments. Network device 300 may include many more or less components than those shown. The components shown, however, are sufficient to disclose an illustrative embodiment for practicing the invention. Network device 300 may represent, for example, BFP 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive that may be coupled to a processor such as CPU 312. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC). Network device 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of processor-readable storage media. Processor-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD), Blu-Ray, or other optical storage, magnetic cassettes, magnetic tape, magnetic disk storage or other magnetic storage devices, or any other physical medium which can be used to store the desired information and which can be accessed by any computing device.

As shown, data stores 352 may include a database, text, spreadsheet, folder, file, or the like, that may be configured to maintain and store various cost models, budget data, audit logs, device data, such as, allocation rules 354, data models 356, datasets 358, or the like. In at least one of the various embodiments, data stores 352 may further include program code, data, algorithms, or the like, for use by a processor, such as central processing unit (CPU) 312 to execute and perform actions. In at least one of the various embodiments, at least some of data and/or instructions stored in data stores 352 might also be stored on another device of network device 300, including, but not limited to cd-rom/dvd-rom 326, hard disk drive 328, or other computer-readable storage device resident on network device 300 or accessible by network device 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IP Sec applications, encryption programs, security programs, SMS message servers, IM message servers, email servers, account managers, and so forth. Mass memory may also include allocation rules 354, web services 366, data models 356, datasets 358, budget and forecasting application 360, allocation application 364, recursive allocations rules 362, or the like.

Web services 366 represent any of a variety of services that may be configured to provide content, over a network to another computing device. Thus, web services 366 include for example, a web server, a File Transfer Protocol (FTP) server, a database server, a content server, or the like. Web services 366 may provide the content over the network using any of a variety of formats, including, but not limited to WAP, HDML, WML, SGML, HTML, XML, compact HTML (cHTML), extensible (xHTML), or the like.

In at least one of the various embodiments, budget and forecasting application 360 may enable a user to generate budgets, allocation rules, recursive allocation, data model, cost models, total cost values for offerings, reports, or the like. Also in at least one of the various embodiments, budget and forecasting application 360, and/or allocation application 364 may employ processes, or parts of processes, similar to those described below and shown in FIG. 4 and above to perform at least some of its actions.

Illustrative Logical System Architecture

FIGS. 4-11 are presented to illustrate logical architectures at least one of the various embodiments for recursive processing of object allocation rules.

Figure 4:
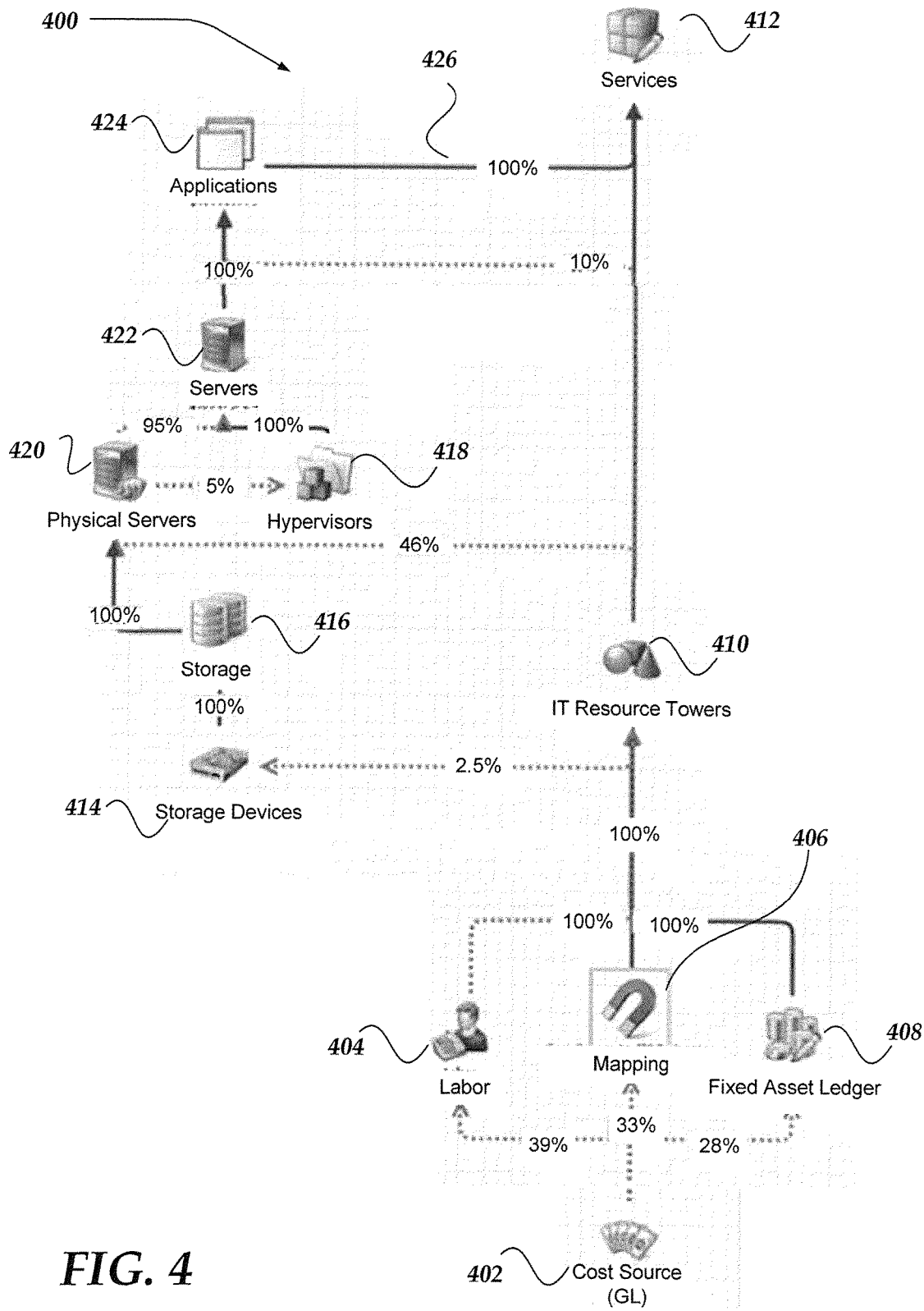
FIG. 4 shows one embodiment of a model for automatically generated business system.

FIG. 4 shows, for at least one of the various embodiments model 400 that may be generated using budget and forecasting platform 107. In at least one of the various embodiments, in this example, model 400 represents a business system and starts with costs flowing from cost source 402, which may be a general ledger (GL) or other type of financial data. In this model, cost source 402 flows to labor 404, fixed asset 408, and to category mapping 406.

In at least one of the various embodiments, in model 400, labor 404 may be allocated 39% of costs, fixed assets 28% of costs, and the remaining 33% may be allocated to a mapping component In at least one of the various embodiments, based on a selected category template, the costs allocated to mapping component 406 may be allocated to the various cost categories that may make up the business system being model.

In at least one of the various embodiments, model 400 shows that 100% of costs flow to IT resource tower 410. From IT resource tower 410 costs flow to services 412. Thus, for this business system, model 400 shows that all the costs are allocated to producing the service offerings that the modeled business organization provides.

In at least one of the various embodiments, the budget and forecasting application may further enable users to gain additional understanding of how the costs from cost source 402 flow through the entire system. Model 400 shows that storage device 414 is responsible for 2.5% for the costs coming from cost source 402. And, that 100% of the costs of storage device 414 flows into the general category of for storage, shown by the allocation trace that shows of 100% of flowing from the storage device 414 to storage component 416. Likewise, model 400 shows that physical servers 420 are burdened by 100% of the costs of storage 416. And, since the business organization modeled by model 400 includes hypervisors that run on physical servers, the costs associate with hypervisor 418 flow from physical server 420. In at least one of the various embodiments, cost for the server category, servers 422 is constituted out of physical servers 420 and hypervisors 418, thus the costs for server 422 flow from those components. Further the applications 424 component of the model may be burdened with 100% of the costs associated with servers 422. Completing the loop, allocation rule 426 shows that service component 412 may be burdened with 100% of the costs associate with applications 424.

Figure 5:
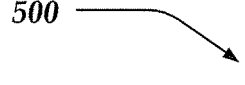
FIG. 5 illustrates a table that may include dataset information.

FIG. 5 shows table 500 that may include information related to datasets that may be used by budget and forecasting platform 107 for generating business systems and data models. In at least one of the various embodiments, table 500 shows an example of source cost data in the form of a dataset of General Ledger (GL) accounting records that may be provided by at least one external data source. In at least one of the various embodiments, a dataset may have more or less columns and detail as shown in table 500. In at least one of the various embodiments, dataset information such as shown in table 500 may be provided in various well-known formats and structures. For example, table 500 may be provided as one or more, XML files, comma separated files, directly from database tables, or the like. Also, in at least one of the various embodiments, datasets may be provided in non-standard formats (e.g., proprietary) where custom scripts and applications may be employed to extract and/or parse values from the datasets.

In at least one of the various embodiments, other types of raw datasets may be provided by other external data sources to budget and forecasting platform 107. For example, datasets that include information about physical IT assets, fixed assets, software licenses, employees, labor costs, insurance records, vendor costs, utility costs (electricity, water, sewer, broadband, natural gas, oil, or the like), consulting expenses, legal fees, or the like.

Figure 6:
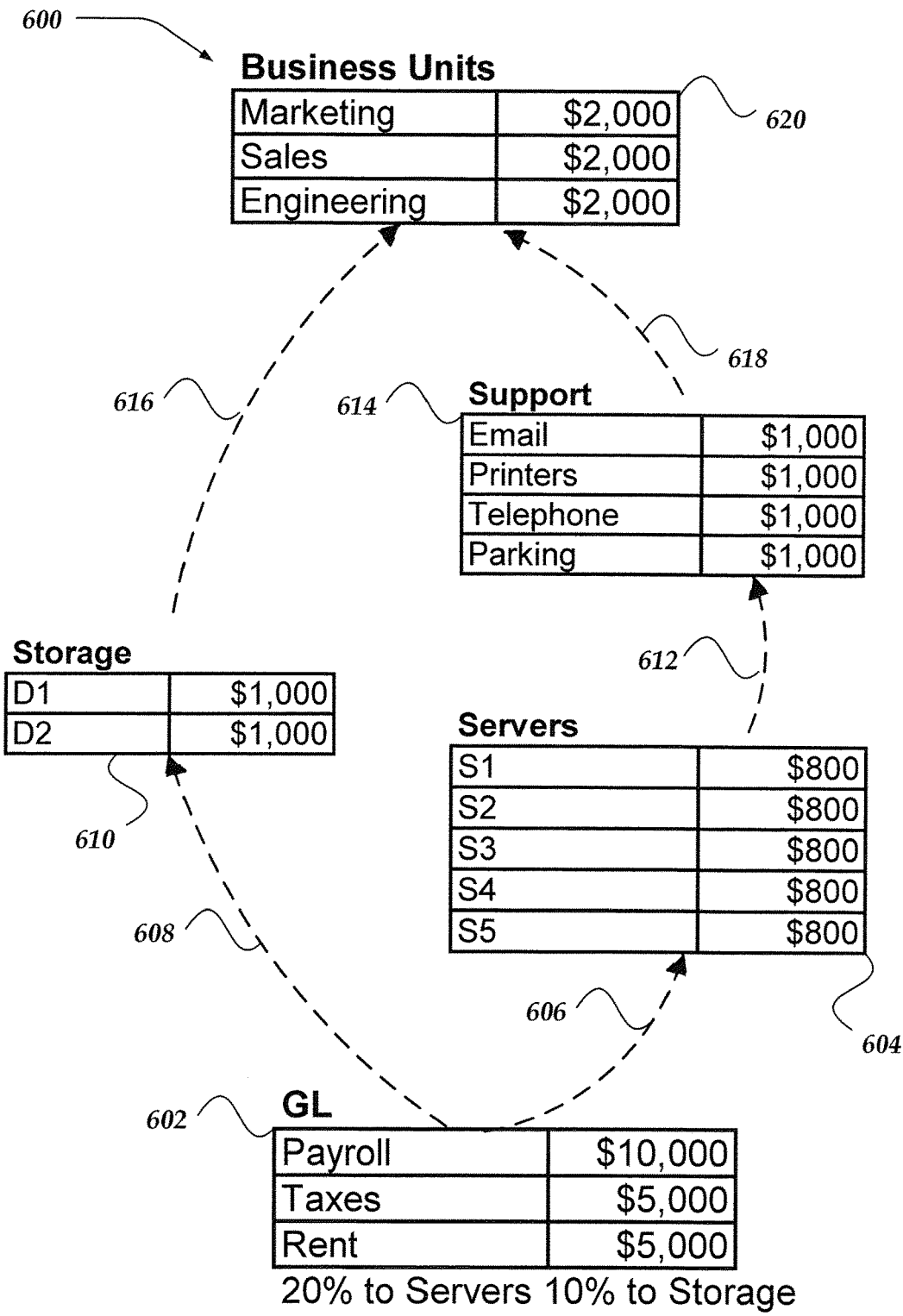
FIG. 6 shows a logical architecture of a model for an automatically generated business system.

FIG. 6 illustrates a portion of a logical architecture for model 600 that may be enabled by at least one of the various embodiments.

In at least one of the various embodiments, the model 600 may have five categories: GL 602, Servers 604, Storage 610, Support 614, and Business Units 620. In at least one of the various embodiments, each category contains a set of cost line items. For example, GL 602 includes cost line items for Payroll, Taxes and Rent. Likewise, Support 614 includes cost line items Email, Printers, Telephone, and Parking. In at least one of the various embodiments, each cost line item has one or more associated cost values. For example, Storage 610 has two cost line items, D1, and D2 (e.g., disk drives) having associated cost values of $1000 each.

Allocation rules may be used to connect categories and/or objects of model 600. In at least one of the various embodiments, allocation rules may show how costs (money) flow between the categories. Resulting in a graph where the categories may be represented as nodes and the allocation rules may be represented as edges. In at least one of the various embodiments, generally a model may be represented by a directed acyclic graph but that is not a requirement for an operative model. In at least one of the various embodiments, a model graph may contain cycles that are resolved or estimated using mathematical techniques, including but not limited to Gaussian elimination, Cholesky decomposition or Newton's method.

In at least one of the various embodiments, allocation rule 606 represents a rule allocating 20% of the money in category GL 602 (source object) to Servers category 604 (target object). In this example, GL 602 includes a total of $20,000, thus 20% of $20,000 (e.g., $4,000) flows based on allocation rule 606 to Servers 604. Likewise, allocation rule 608 may allocate $2,000 from GL 602 to Storage 610. The other allocation rules in model 600 allocate 100% of the money to the next category: allocation rule 612 directs 100% of the money (e.g., $4,000) to flow to Support 614; allocation rule 618 directs 100% of the money in Support (e.g., $4,000) to flow to Business Units 620; and allocation rule 616 directs 100% of the money from Storage 610 to flow to Business Units 620.

In at least one of the various embodiments, money that flows into the category may be allocated among the included cost line items. In at least one of the various embodiments, each category may have one or more rules that may describe the assignment ratios for how the money in a category may be assigned to cost line items. For the categories 604, 610, 614, and 620, simple allocation rules assign the money in the category evenly among the cost line items comprising each category. GL 602 may have different assignment ratios, in this non-limiting example, the assignment ratio between the cost line items may be 50% to Payroll, 25% to Taxes, and 25% to Rent.

In at least one of the various embodiments, an assignment ratio may represent how the money in an actual budget may be assigned to the actual cost line items. In at least one of the various embodiments, rules may be applied that distribute the money based on formulas that may be defined by the users or administrators who designed the model. In at least one of the various embodiments, the assignment ratios and allocations may be modified as part of the modeling process.

The model 600 is a simplified model useful for facilitating discussion and understanding of the embodiments, since allocation rules for models of large commercial entities can be numerous and complex. However, model 600 is at least sufficient to enable one of ordinary skill in the art to practice what is claimed herein.

Figure 7:
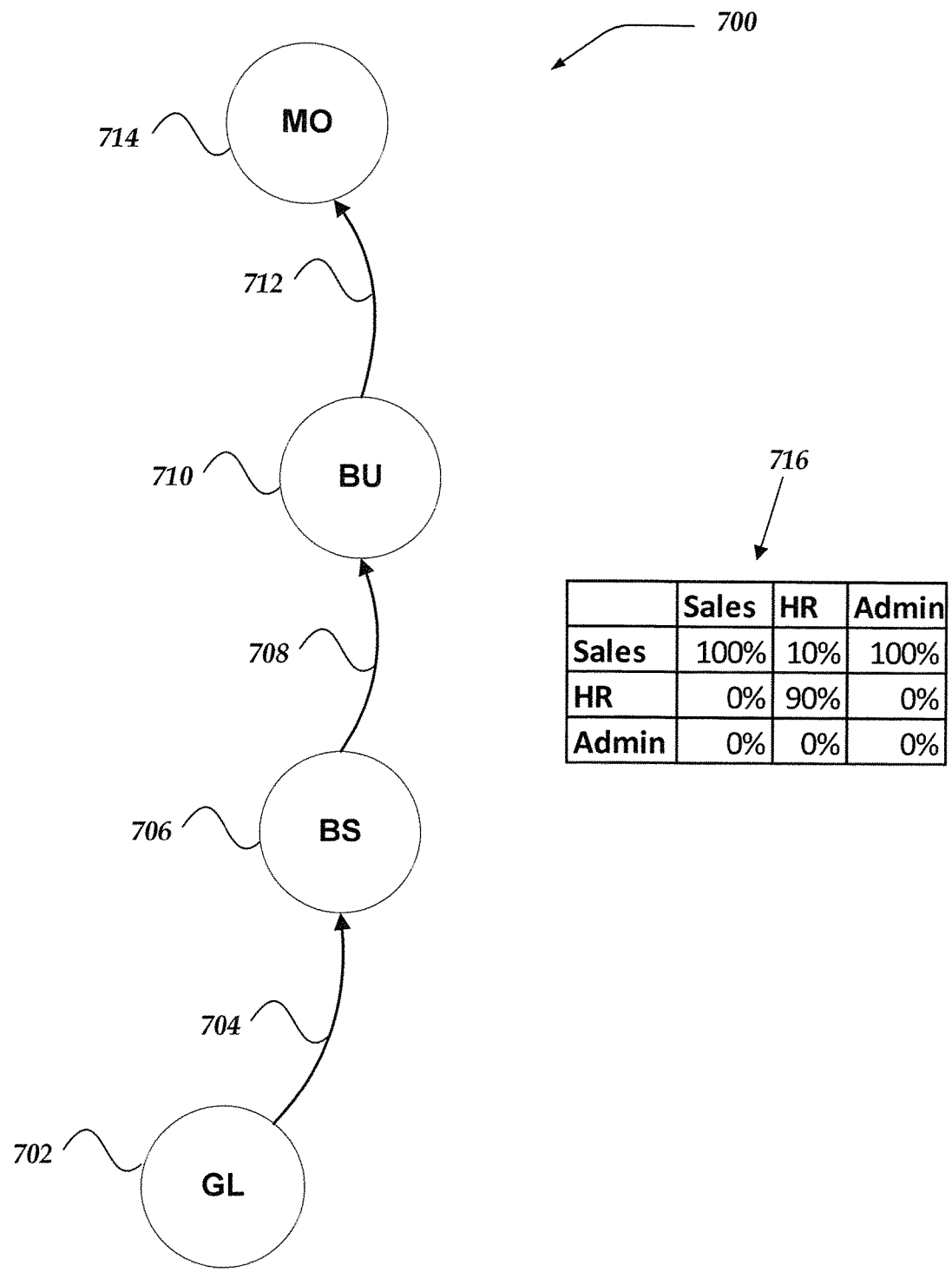
FIG. 7 shows a portion of a data model in accordance with at least one of the various embodiments.

FIG. 7 shows a portion of data model 700 in accordance with at least one of the various embodiments. In at least one of the various embodiments, as mentioned above, data models may be arranged to model how costs may be allocated to different objects (e.g., categories) that are part of a business system. (See, FIGS. 3-5 and their accompanying descriptions.) Data model 700 represents a segment of a data model that models the allocation of costs from cost source object 702. In this model, cost source object 702 allocates costs using allocation rule 704 to business service object 706. Next, in at least one of the various embodiments, data model 700 shows that the costs may be further allocated, using allocation rule 708 from business service unit 706 to business unit object 710. And, in at least one of the various embodiments, the costs from business unit object 710 may be allocated according to allocation rule 712 to model object 714. Note, for this example, model object 714 simply represents the boundary of this model segment. Thus, in at least one of the various embodiments, it may be a terminating node, a business service object, a business unit object, or the like.

In at least one of the various embodiments, cost object 702 may be a representation of a General Ledger (GL), dataset data, or the like. In some embodiments, business service object 706 may be representative of an internal business service such as storage, servers, or the like. Likewise, business unit object 710 may be representative of a business unit such as a sales department, marketing department, engineering department, or the like. And, in at least one of the various embodiments, model object 714 may be representative of any other object that may be in a business system model and/or a cost data model. For example, model object 714 may be a product or service the offered by the modeled business system, another business service, business unit, or the like. Here, it simply represents that the model may continue or terminate depending on the system being modeled.

In at least one of the various embodiments, the details of how costs may be allocated from one object in the model to another may be encapsulated in one or more allocation rules. Allocation rules describe how cost values flow between the modeled objects. In at least one of the various embodiments, allocation rule 716 represents an example of a simple allocation rule that describes how cost values flow from business service object 706 to business unit object 710. (In this example, business unit object 710 may represent a sales department for an organization.) The first line of allocation rule 716 is arranged to represent that 100% of the cost of the sales department, 10% of the cost of the HR department, and 100% of the costs of the Admin department are allocated to sales. The second line of allocation rule 716 shows that 90% of the cost of Human Resources (HR) is allocated back to the HR department. And, the third line of allocation rule 716 shows that Admin is not responsible for any costs (since the Sales department is taking all of the costs for Admin). One of ordinary skill in the art will appreciate that allocation rule 716 is provided as a simple example, and that real-life data models may include arbitrarily complex allocation rules that may include arbitrarily complex formulas to map costs and/or values between model objects. However, allocation rule 716 is sufficient to at least describe, enable, and disclose at least the innovations contained in this application. Further, in model 700, business service object 706 may be considered to be a source object and business unit object 710 may be considered its target object. With allocation rules 708 directing how values flows from the source object to the target object.

Figure 8:
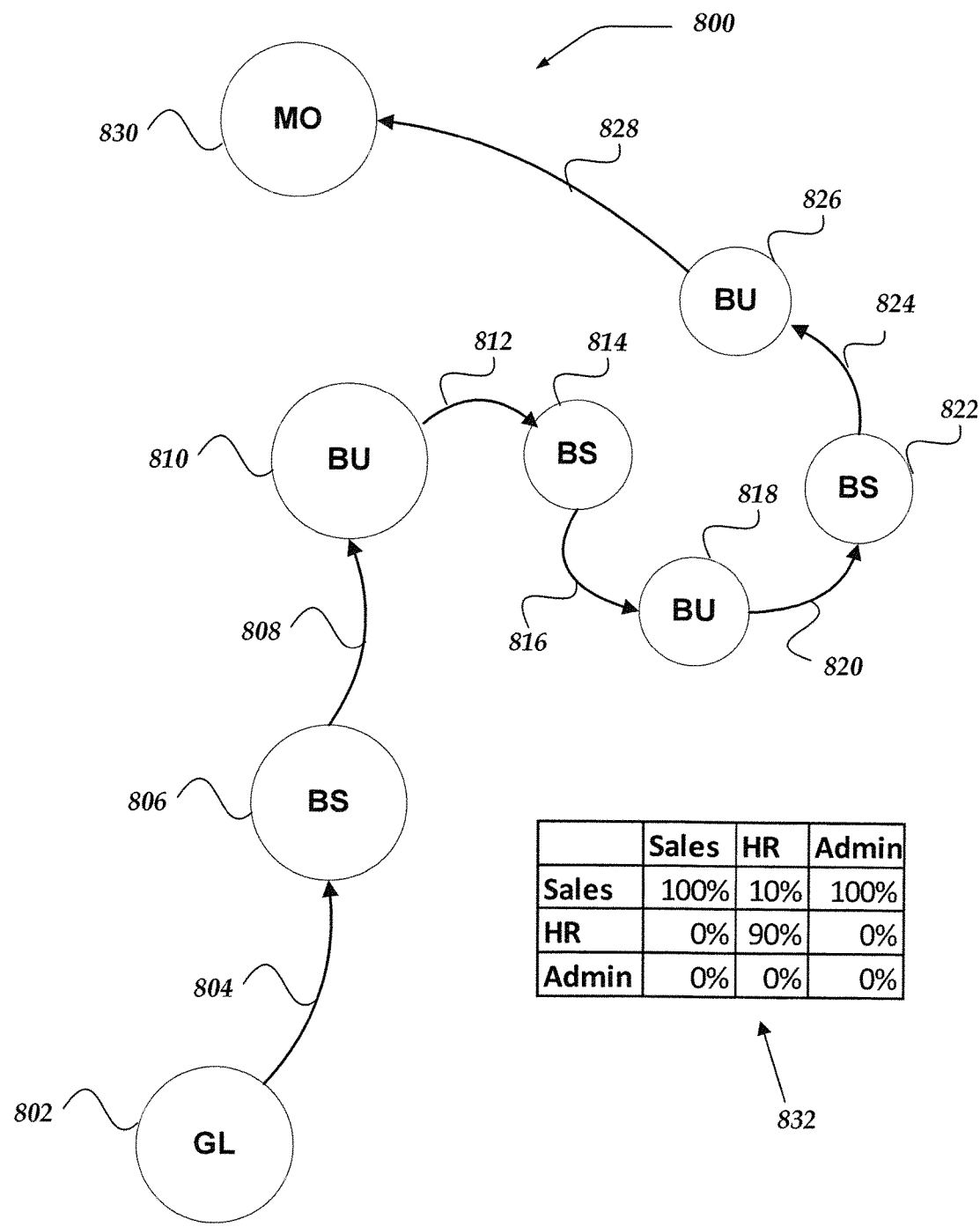
FIG. 8 shows a portion of a data model in accordance with at least one of the various embodiments.

FIG. 8 shows a portion of model 800 in accordance with at least one of the various embodiments. Model 800 is illustrative of a data model similar to data model 700, except that it is arranged to apply allocation rule 832 multiple times for the same categories.

In at least one of the various embodiments, cost object 802 may be a representation of a General Ledger (GL), dataset data, or the like. In some embodiments, business service object 806 may be representative of an internal business service such as storage, servers, or the like. Likewise, business unit objects 810 may be representative of a business unit such as a sales department, marketing department, engineering department, or the like. And, in at least one of the various embodiments, model object 830 may be representative of any other object that may be in business system model and/or cost data model. For example, model object 830 may be a product or service the modeled business system offers, it may be another business service, business unit, or the like. Here, it simply represents that the model may continue or terminate depending on the system being modeled.

In at least one of the various embodiments, one way to apply the same allocation rule repeatedly to same categories/objects may be to directly model the repetition using additional objects and allocation rules. In this example, the allocation rules and objects coming off of business unit object 810 may represent this type of repetitive modeling. Allocation rules 812, 816, 820, 824, and 828 may represent the repeated execution of allocation rule 832 to model data objects that represent business unit object 810 and business service object 806. (Note, for this example, allocation rule 832 has the same description as allocation rule 716 in FIG. 7) In this example, business unit objects 810, 818, and 826 may represent that same business unit (e.g., sales department). However, they may all have different computed values, because allocation rule 832 has been recursively applied to the same categories/objects. Likewise, in this example, business service object 806, 814, and 822 may all represent the same business service (e.g., storage) but they will contain different values because the allocation rule (e.g., allocation rule 832) has been repeatedly applied. In at least one of the various embodiments, similar to model 700, the details of how costs may be allocated from one object in the model to another may be encapsulated using one or more allocation rules, such as 832.

Figure 9:
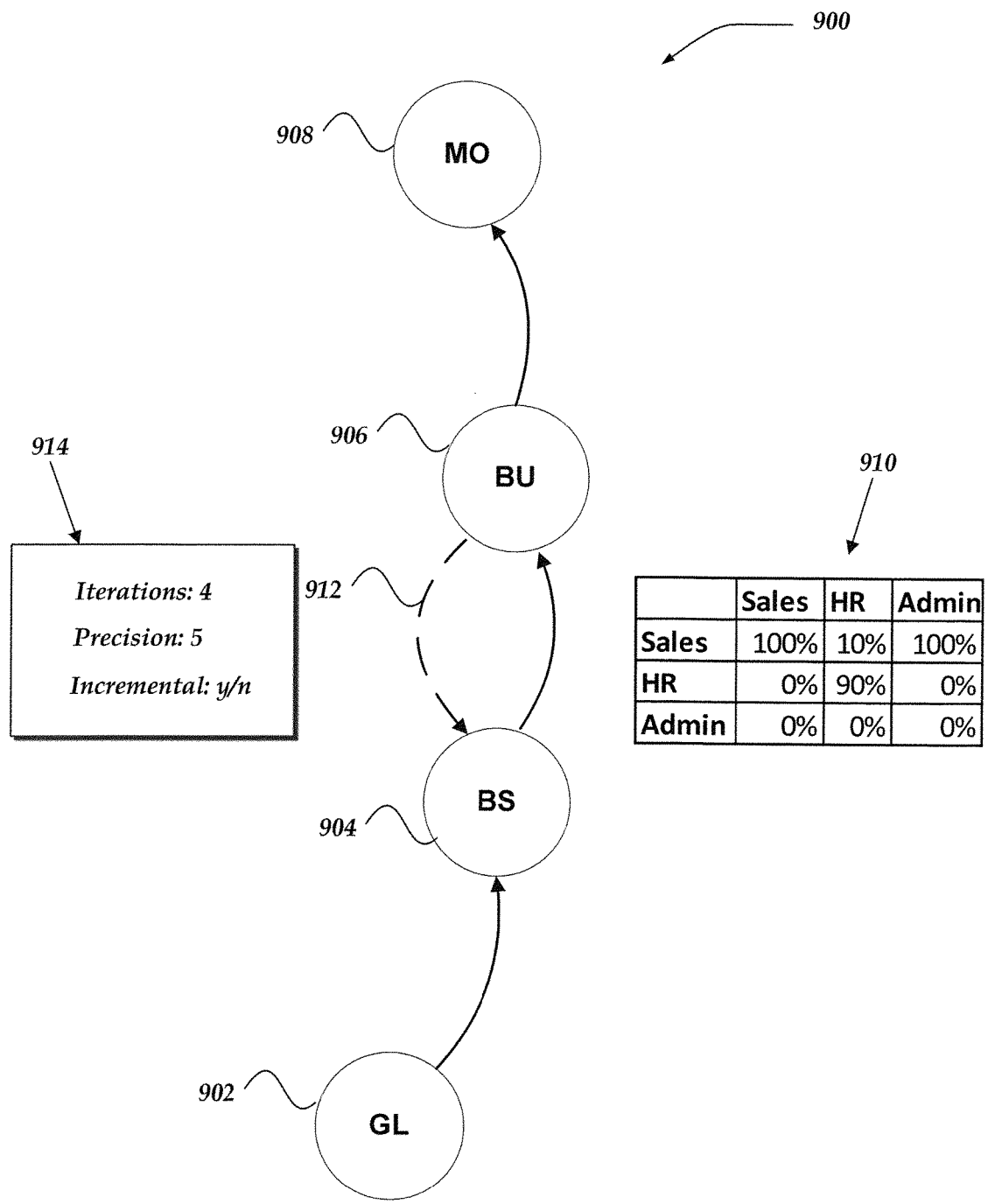
FIG. 9 shows a portion of a data model using recursive allocation rules in accordance with at least one of the various embodiments.

FIG. 9 shows a portion of data model 900 using recursive allocation rules in accordance with at least one of the various embodiments. Model 900 is similar to model 700 and model 800, in that objects 902, 904, 906, and 908 may be associated with allocation rules that defines how cost and/or value flows from one object to the next. Likewise, allocation rule 910 may be representative of an allocation rule for mapping values (costs) between business service object 904 (source object) and business unit object 906 (target object). (See, description of allocation rule 716 in FIG. 7.)

However, in at least one of the various embodiments, model 900 includes a recursive allocation, illustrated in the model by recursive allocation rule 912. In at least one of the various embodiments, a recursive allocation rule may be employed to collapse the repeated application of one or more allocation rules into a single rule in the model. For example, recursive allocation rule 912 may be used to replace the repetitive inclusion of rules and objects (e.g. it can replace the allocation rules and objects 812-828 shown in FIG. 8).

In at least one of the various embodiments, recursive allocation rule detail 914 may be used to define one or more properties of the recursive allocation rule. For example, in this case, it defines a number of recursive iterations to apply the allocation rule (e.g., in this example, four times), And it enables a precision threshold to be defined, such that, the precision threshold may be employed as a terminal condition that may end the recursive application of the allocation rule before all the iterations have been executed. For example, in at least one of the various embodiments, if a goal of the model is to recursively apply an allocation rule until all of the costs associated with HR have been applied, it may be advantageous to stop the recursive processing if the remaining (unassigned) HR costs have been reduced to less than some defined value (e.g., $5).

In at least one of the various embodiments, recursive allocation rules may span multiple cost objects may be comprised of multiple allocations rules spanning between multiple objects—rather that just being limited to allocating costs from a single cost object to another cost object. In other words, in at least one of the various embodiments, a recursive allocation may span any arbitrary portion of the model. For example, a multiple object recursive allocation rule may be defined to go from GL object 902 to Model Object 908 such that allocation rules linking each object may be applied recursively.

Figure 10:
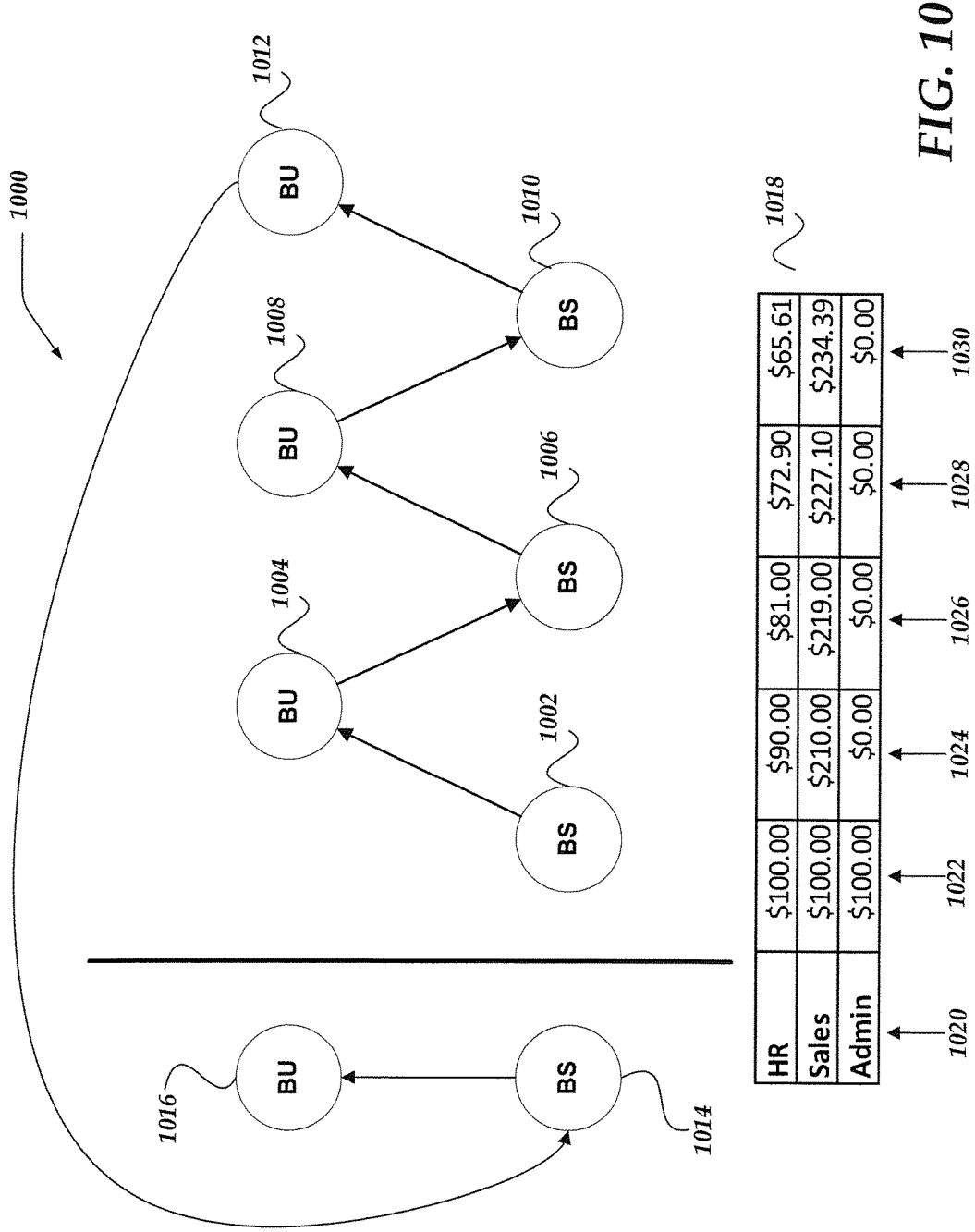
FIG. 10 shows a portion of a logical architecture for recursive allocation rules in accordance with at least one of the various embodiments.

FIG. 10 shows a portion of logical architecture 1000 for the application of recursive allocation rules in accordance with at least one of the various embodiments. In at least one of the various embodiments, as mentioned above, recursive allocation rules may be described as the repeated recursive application of the same allocation rule to the same objects and/or categories. In at least one of the various embodiments, architecture 1000 depicts an allocation rule that has three components/drivers (e.g., Sales, HR, and Admin) being applied recursively to two model objects with business service object acting as the source object and a business unit object acting as the target object.

Starting at business service object 1002, an allocation rule is applied to assign costs to business unit object 1004. Next, the same allocation rule may be executed again using the results produced from the previous run. In this example, business service object 1006 represents that same object as business service object 1002 except the values for business service object 1006 may be based on the previous application the allocation rule. Next, the same allocation rule is applied to business service object 1006 to assign values to business unit object 1008. Likewise, for business service object 1010 and business unit object 1012. In at least one of the various embodiments, if the recursive allocation rule reaches a terminating condition, such as running the defined number of iterations, falling below a precision threshold, the final result may be fed into business service object 1014 and the underlying allocation rule may be applied to business unit object 1016 one more time.

Note, one of ordinary skill in the art will appreciate that if a recursive allocation rule spans more than one cost object and/or allocation rule, those additional intervening allocation rules may be applied during each recursive allocation step. For example, if there are three intervening allocation rules between the BS and the BU in question, all three rules are applied to produce a result at each step shown in FIG. 10.

Table 1018 illustrates the recursive application of an example an allocation rule (e.g., allocation rule 910) for at least one of the various embodiments. Column 1020 shows the three cost drivers for this allocation rule, HR, Sales, and Admin. Column 1022 holds the base values for each of the cost drivers, for this non-limiting example each driver has a starting value of $100. At column 1024 the results of applying allocation rule 910 the first time is shown. Here it shows that 100% of the costs of Sales, 10% of the costs of HR (10% of $100) and 100% percent of the cost of Admin has been applied has been applied to the cost of Sales. Thus, the unallocated costs for HR are now $90, the unallocated costs for Admin is $0 and the costs allocated to the Sales department is $210. Likewise, columns 1026-1030 illustrate the values generated by recursively applying the allocation rule. In other words, in at least one of the various embodiments, the values generated by running a previous iteration of the allocation rule may be used to seed the next iteration.

Furthermore, one of ordinary skill in the art will appreciate that objects discussed herein may be implemented using one or more computer programming languages, computer scripting languages, database stored procedures, or the like. Further, in at least one of the various embodiments, cost objects and/or data model objects may be stored and/or implemented using databases, including, SQL databases, object oriented databases, column-oriented databases, NoSQL databases, custom databases, or the like.

Figure 11:
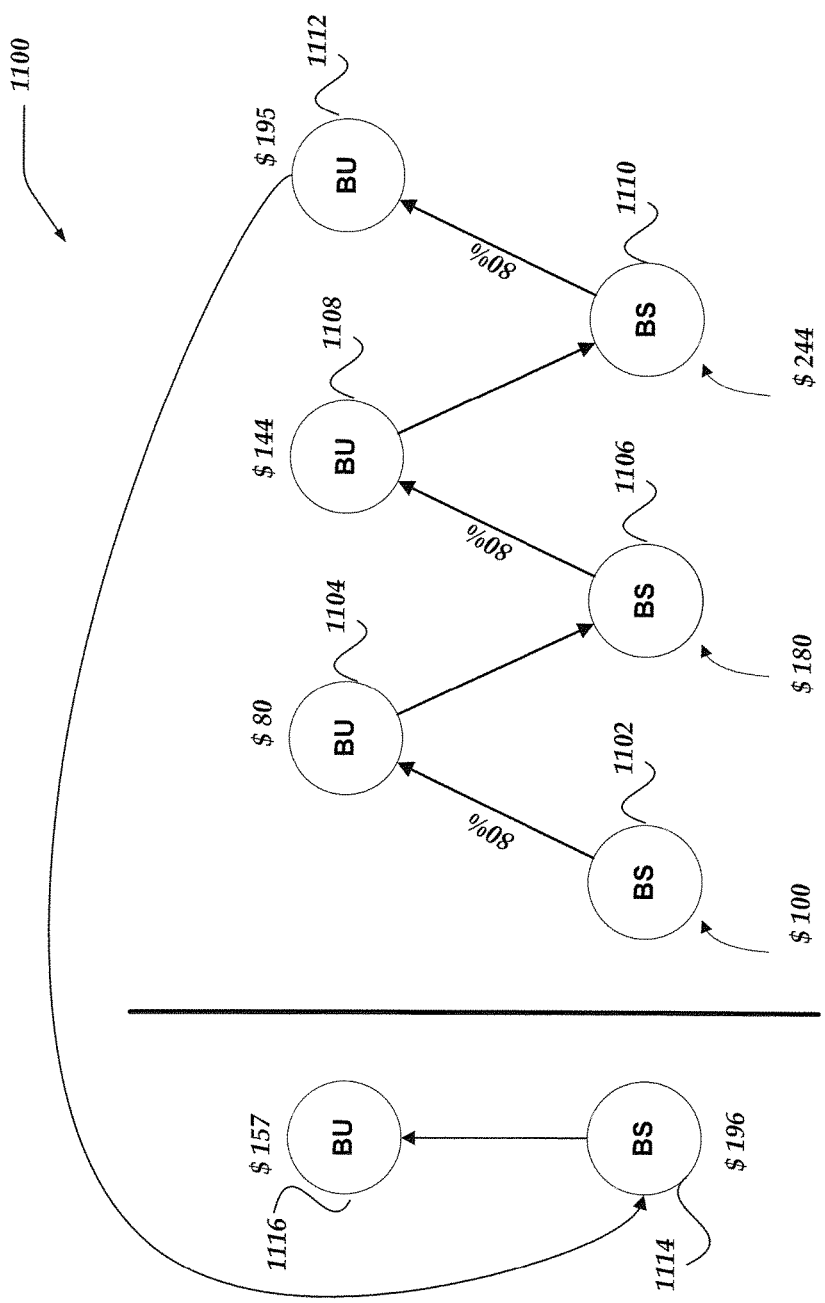
FIG. 11 shows a portion of a logical architecture for recursive allocation rules using incremental accumulation in accordance with at least one of the various embodiments.

FIG. 11 shows a portion of logical architecture 1100 for applying recursive allocation rules using incremental accumulation in accordance with at least one of the various embodiments. In at least one of the various embodiments, some data models may be configured to carry forward the results of applying an allocation rule and incrementally add to the base/starting values of the source object. Accordingly, in at least one of the various embodiments, this incremental processing takes the results of the previous application of the rule and adds them to the source object values rather than replacing them with the result of running the allocation rule.

For example, in at least one of the various embodiments, assuming that business service object 1102 has a starting value of $100 that is allocated to business unit object 1104 using an allocation rule that passes 80% of the value from the source object to the target object, business unit object 1104 will be set to $80 (80% of $100). For the next iteration, this $80 may be added to the original starting value of the source object resulting in value of $180 ($100+$80) for business service object 1106. Applying the 80% allocation rule again yields a value of $144 at business unit object 1108. Next, the value at business unit object 1108 is added again to the starting source object starting value, making business service object 1110 have a value of $244 ($100+$144). Next, applying the 80% allocation rule produces a value of $195 for business unit object 1012. In at least one of the various embodiments, the final step at business service object 1114, the incrementing step may be omitted yielding a final result for business unit object 1116 of $157 (80% of $196).

Note, one of ordinary skill in the art will appreciate that if a recursive allocation rule spans more than one cost object and/or allocation rule, those additional intervening allocation rules may be applied during each recursive allocation step. For example, if there are three intervening allocation rules between the BS and the BU in question, all three rules are applied to produce a result at each step shown in FIG. 11.

Figure 12:
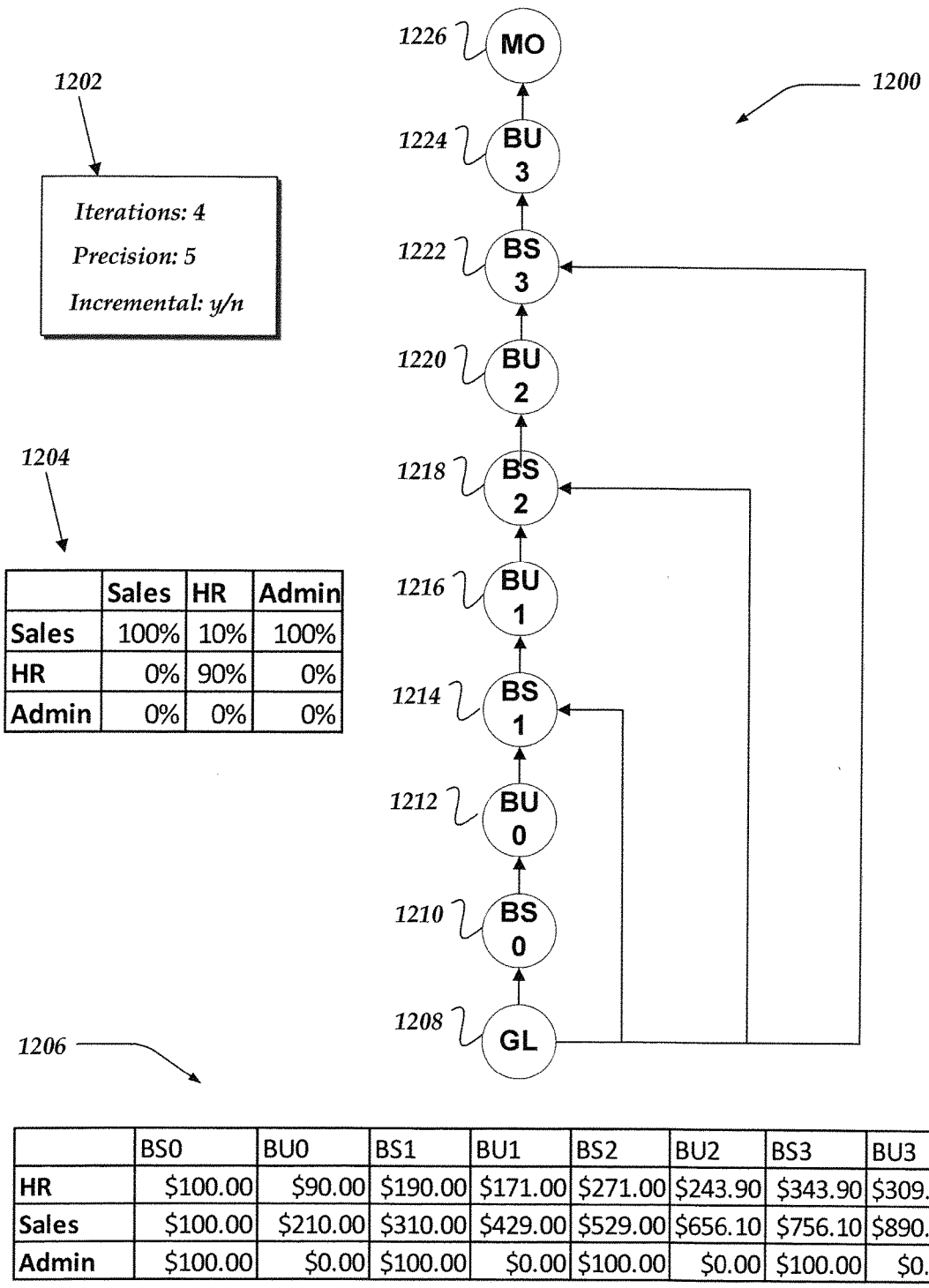
FIG. 12 shows a portion of a logical architecture for recursive allocation rules with an expanded recursive allocation rules for drill through in accordance with at least one of the various embodiments.

FIG. 12 shows a portion of logical architecture 1200 for recursive allocation rules with an expanded recursive allocation rule for drill through in accordance with at least one of the various embodiments. In at least one of the various embodiments, recursive allocation rules may be employed to optimize and/or simplify the generation and maintenance of data models. However, in at least one of the various embodiments, if a user wants to trace the model in a reverse direction, recursive allocation rules may obscure details related to how costs actually flow through the model.

For example, referring again to FIG. 9, in at least one of the various embodiments, allocation rule 910 includes a line for the Admin cost driver. In this rule, Admin allocates all of its costs to Sales such that in the first iteration of a recursive allocation all of the costs associated with Admin may be allocated to Sales. In the second and subsequent iterations, Admin will show cost allocations of zero ($0) hiding the fact that it may have contributed to the cost of BU 906. In the case of analyzing the costs flowing up to MO 908, the hiding of the Admin costs may be acceptable because the Admin costs are accounted for in the end and advantageous since the complexity of the model may be reduced. Similarly, additional details related to the intervening iterations performed by the recursive allocation rule may be obscured as well.

In at least one of the various embodiments, a user may want to trace costs in reverse, or drill down from a business unit object to analyze how different cost drivers may be contributing to the overall costs associated with the business unit. In these cases, in at least one of the various embodiments, the information obscured by the recursive allocation rule may not be desirable or advantageous. In at least one of the various embodiments, to accommodate drill down searches/commands where it may be advantageous or desired to see the information that is obscured by recursive allocation rules, the budget and forecasting application may be arranged to expand recursive allocation rules that may be included in the data model for generating drill-down reports.

In at least one of the various embodiments, logical architecture 1200 may represent a portion of a data model that has been generated as a result of expanding recursive allocation rule. This portion of the data model may have been generated based on recursive allocation rule detail 1202 and allocation rule 1204 (e.g., having the same properties as used in FIG. 9). However, rather than generate a recursive rule in the modal like is shown in FIG. 9, the recursive rules may be unwound into a plurality of model objects, shown here as, object 1210 through object 1224. With object 1208 representing the GL object and object 1226 representing a model object that terminates this portion of the model—similar to GL object 902 and model object 908 respectively. Furthermore, table 1206 illustrates how money may flow up from the GL object 1208 through each of the temporary objects that were automatically generated as part of unrolling the recursive allocation rule.

Furthermore, object 1210, object 1214, object 1218, and object 1222 each represent the "same" business service object; they are modeled separately to reflect the different stages or iterations of the recursive allocation rule that may have been unwound. Likewise, in at least one of the various embodiments, object 1212, object 1216, object 1220, and object 1224 each represent the "same" business unit object.

In at least one of the various embodiments, with the recursive allocation rule unwound, the data model enables visibility to the details of how the money flows through the model, including details that may have been obscured but the operation of a recursive allocation rule. Not unlike model 600 in FIG. 6, albeit with different objects, different costs, and different allocation rules.

In at least one of the various embodiments, allocation rule 1204 that was used in the recursive allocation rule is applied to each business service/business unit object pair. For example, in this case, allocation rule 1204 may be applied in the model moving up from BS object 1210 to BU object 1212, from BS object 1214 to BU object 1216, and so on. As reflected in table 1206, the original values for the cost component drivers (HR, Sales, and Admin) are fed back into the model at BS1 object 1214, BS2 object 1218, and BS3 object 1222.

Generalized Operations

FIGS. 13-17 represent the generalized operations of recursive processing of object allocation rules in accordance with at least one of the various embodiments. In at least one of the various embodiments, processes 1300, 1400, 1500, 1600, and 1700 described in conjunction with FIGS. 13-16 may be implemented by and/or executed on a single network device, such as network device 300 of FIG. 3. In other embodiments, these processes or portions thereof may be implemented by and/or executed on a plurality of network devices, such as network device 300 of FIG. 3. However, embodiments are not so limited, and various combinations of network devices, client devices, virtual machines, or the like may be utilized. Further, in at least one of the various embodiments, the processes described in conjunction with FIGS. 13-17 may be operative in budget and forecasting architectures such as those described in conjunction with FIGS. 4-12.

Figure 13:
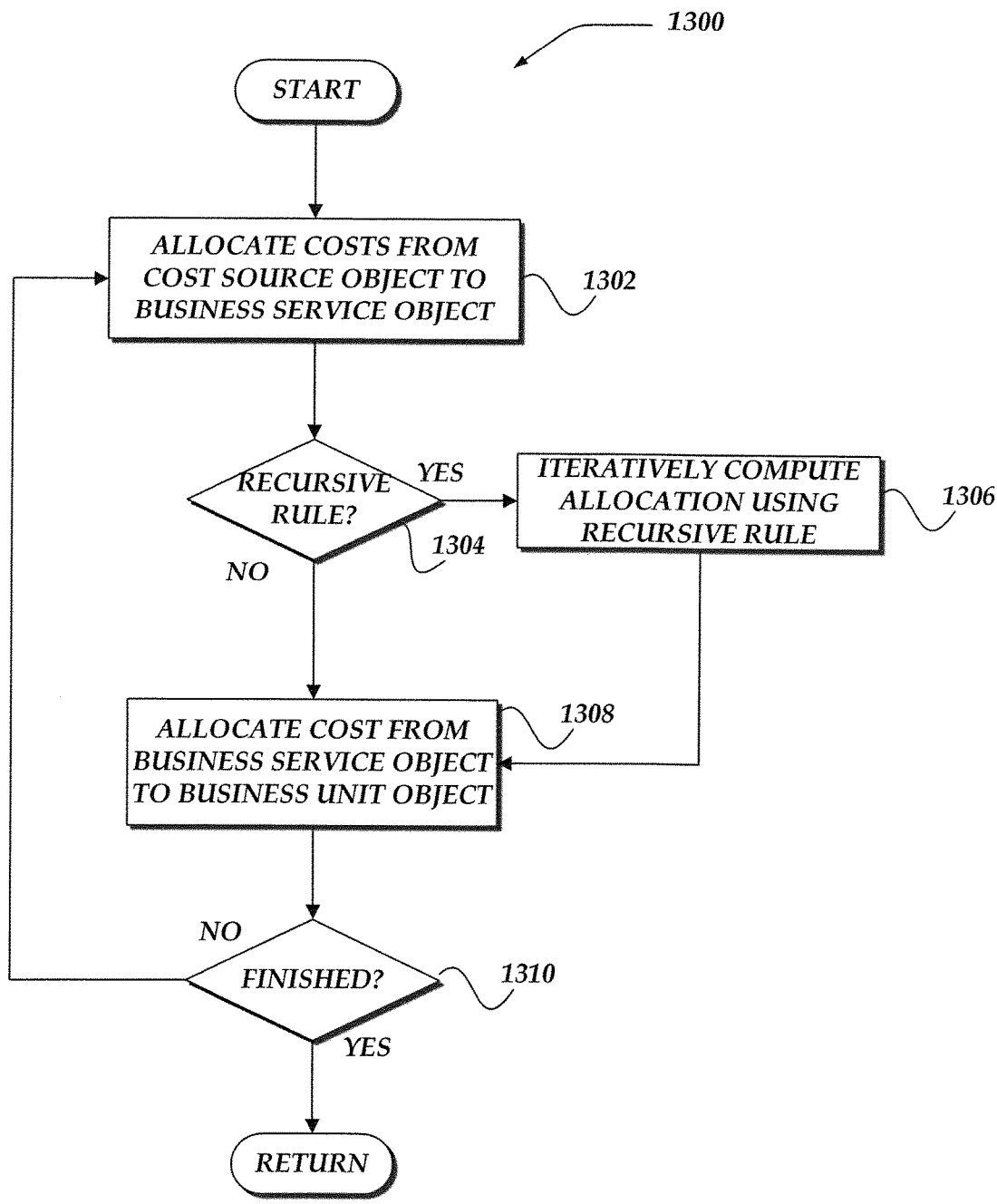
FIG. 13 illustrates a flowchart for a process for allocating costs in data model in accordance with at least one of the various embodiments.

FIG. 13 illustrates a flowchart for process 1300 for allocating costs in data model in accordance with at least one of the various embodiments. After a start block, at block 1302, the cost values from a cost source object may be allocated to a business service object. In at least one of the various embodiments, at some point in the data model values such as costs may enter the model. In some case, as mentioned above, these initial values may be provided from a dataset such as a General Ledger, or the like.

In at least one of the various embodiments, there may be one or more intervening cost objects between a cost source and a particular business service object. Further, a model may be implemented using data structures that support various graph traversal methods. Accordingly, the various source objects, target objects, and allocation rules in a model may be reached using various graph traversal methods. In some of the embodiments, traversal mechanism may be selected based on the type of model being used and the purpose for the model.

At decision block 1304, in at least one of the various embodiments, if the allocation rule going from a source object to a target object is a recursive allocation rule, control may flow to block 1306. Otherwise, in at least one of the various embodiments, control may flow to block 1308.

In at least one of the various embodiments, as the model may be traversed, the Budget and Forecasting Platform may determine if an allocation rule linking a source object with a target object may be a recursive allocation. In at least one of the various embodiments, recursive allocation rules may be indicated using well-known programming techniques, including, setting a flag in data structure, attributes values stored in database table, naming scheme, or the like.

At block 1306, in at least one of the various embodiments, a recursive allocation rule may be employed to iteratively determine allocations of values between the business service object and the business unit object. Thus, in at least one of the various embodiments, the particular recursive allocation rule indicated in the model may be located and/or retrieved from a database, memory cache, or the like, and executed to completion. (See, FIG. 13-15 and accompanying descriptions.)

Note, one of ordinary skill in the art will appreciate that if a recursive allocation rule spans more than one cost object and/or allocation rule, those additional intervening allocation rules may be applied during each recursive allocation step. For example, if there are three intervening allocation rules between the Business Service Object and the Business Unit Object in question, all three rules are applied to produce a result at each iterative step.

At block 1308, in at least one of the various embodiments, the data model may be updated to reflect the application of the recursive allocation rule to show the allocation of values from the business service object to the business unit object. Next, at decision block 1310, if a Budget and Forecasting Platform, such as BFP 107, may be finished processing allocation rules for the model, control may be returned to a calling process; otherwise, in at least one of the various embodiments, control may loop back to block 1302.

Furthermore, even though process 1300 illustrates values being allocated from business service objects to business unit objects, clearly, the innovation described herein are not so limited. Generally, models may employ allocation rules to allocate various values, including costs, between all varieties of source objects and target objects, some of which may be business service objects and/or business unit objects. Likewise, a source object may be associated (by allocation rules) with one or more target objects and/or one or more cost sources. And, target object be concurrently/simultaneously allocated values from one or more source objects.

Figure 14:
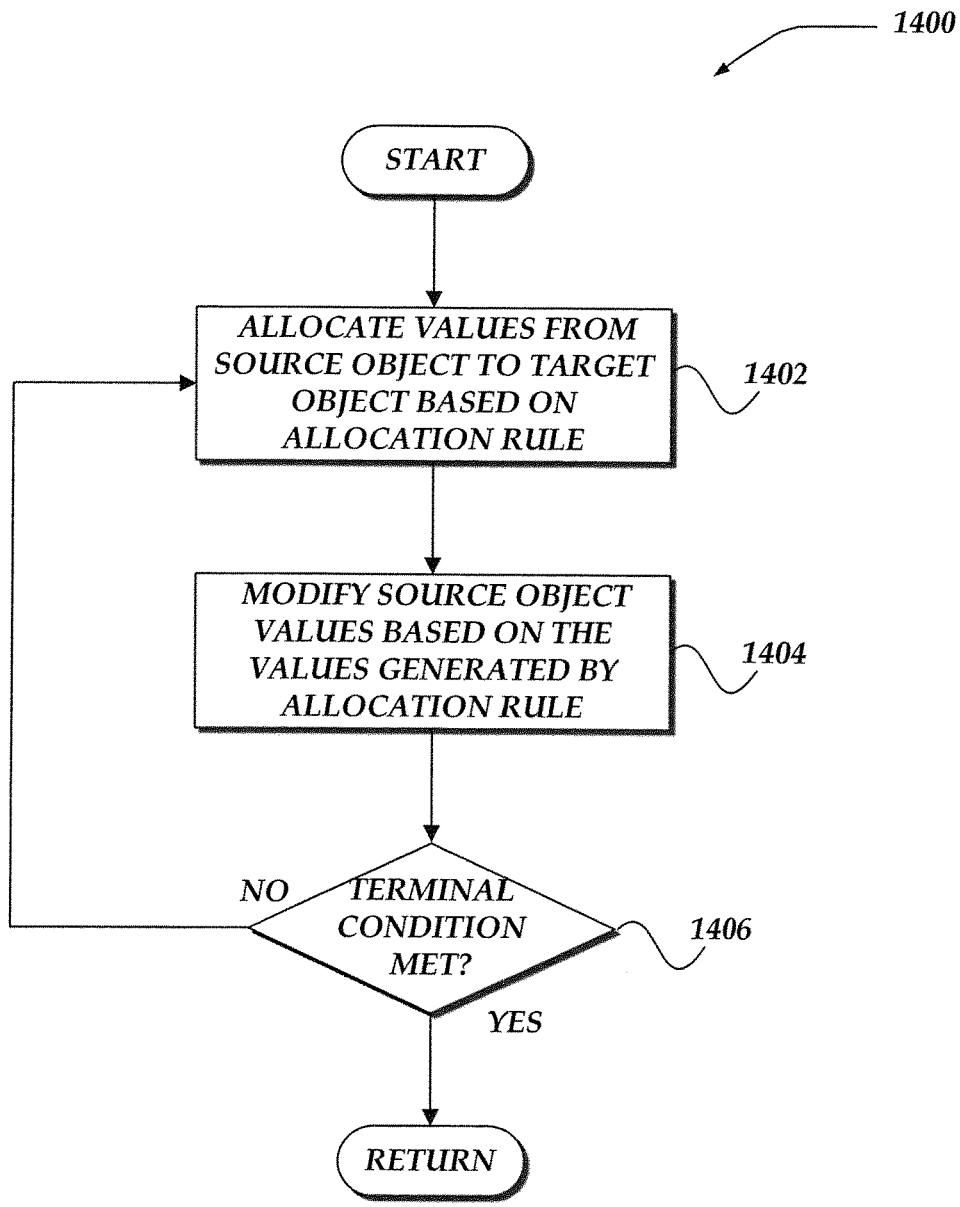
FIGS. 14-15 illustrate flowcharts for processes for recursive allocation rules in accordance with at least one of the various embodiments.

FIG. 14 illustrates a flowchart for process 1400 for recursive allocation rules in accordance with at least one of the various embodiments. After a start bock, at block 1402, in at least one of the various embodiments, values from a source object may be assigned to the target object based on the application of an allocation rule that is in effect.

In at least one of the various embodiments, the processing of a recursive allocation rule may begin with a source object having one or more initial values (e.g., cost values for one or more cost drivers). Each iteration through the recursive allocation rule, the current values of the source object are used by the allocation rule to allocate values from the source object to the target object.

At block 1404, in at least one of the various embodiments, the source object values may be modified based on the values generated by the previous execution of the allocation rule. For example, running an allocation rule on a source object that has multiple values may reduce some values and increase other values depending on the value and details of the allocation rule. See, FIG. 10, for an example.

At decision block 1406, in at least one of the various embodiments, if a terminal condition is met, control may be returned to a calling process. Otherwise, in at least one of the various embodiments, control may loop back to block 1402 to continue processing the recursive allocation rule.

In at least one of the various embodiments, terminal conditions may include a defined upper limit on the number of iterations. Defined limits may be set from a variety of sources, including, users, configuration values, model properties, or the like. In at least one of the various embodiments, precision threshold values may be used as terminal conditions. In at least one of the various embodiments, precision thresholds may be defined to trigger termination of a recursive rules if the measured value falls below the threshold value. For example, if a recursive allocation rule reduces a given value by 10% each iteration, a user may set the precision threshold to be some value, such as, $10, where any further processing is deemed by the user to be unnecessary.

In at least one of the various embodiments, a recursive allocation rule may have one or more terminal conditions operative at the same time. For example, a recursive allocation may be set to run no more than five iterations, or to stop if a precision threshold is met or exceeded.

In some embodiments, a user who designs and/or modifies the model may establish the terminal conditions based on the purpose of the model and the type business system being modeled.

Figure 15:
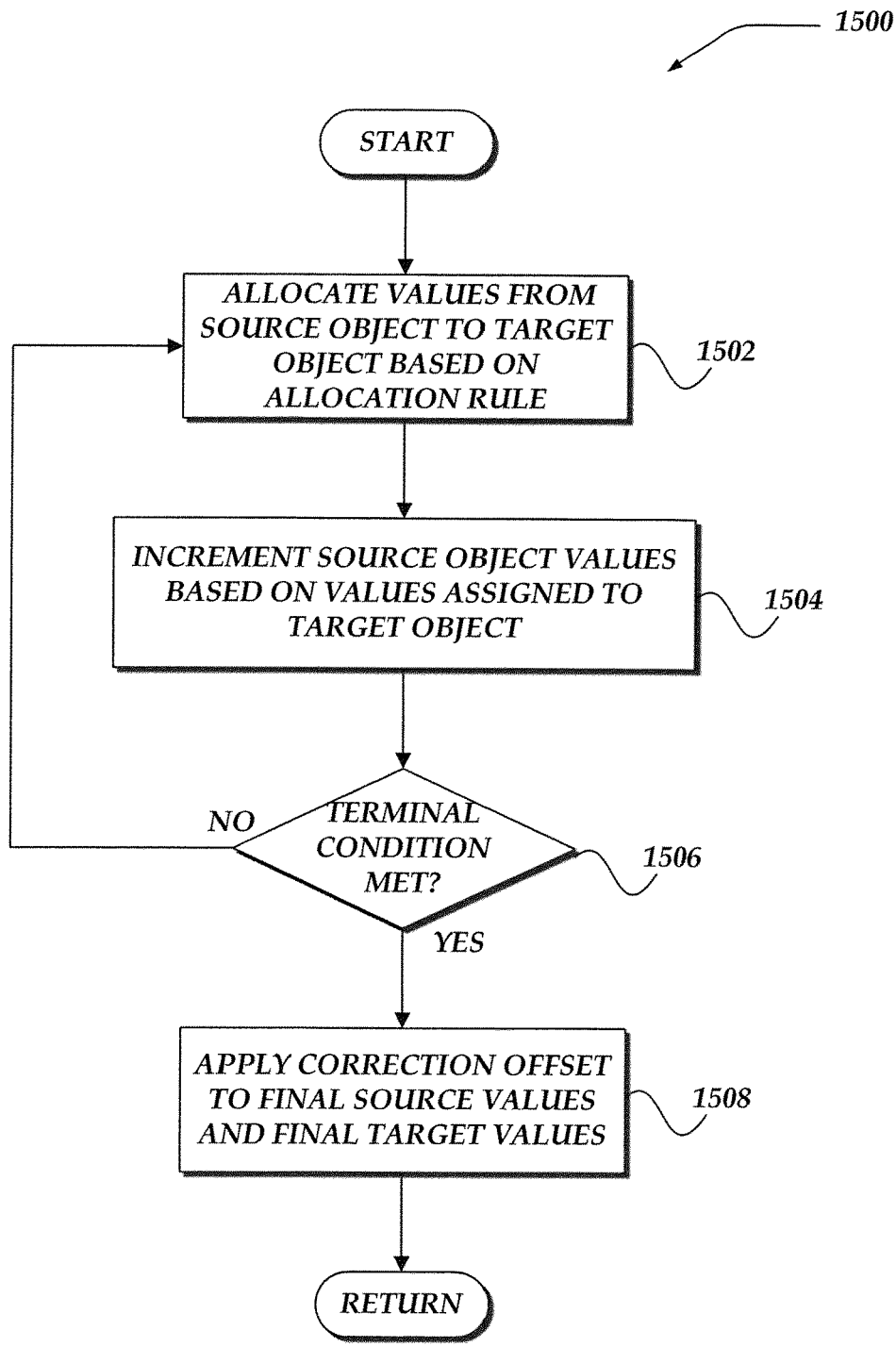

FIG. 15 illustrates a flowchart for process 1500 for recursive allocation rules using incremental value accumulation in accordance with at least one of the various embodiments. After a start block, at block 1502, in at least one of the various embodiments, values from the source object may be allocated to the target object based on the allocation rule that is being applied. At block 1504, in at least one of the various embodiments, the source object values may be incremented by an amount equal to the values generated by previously executed allocation rule. Thus, rather than replacing the values in the source object with values computed by the allocation rule, the values computed by the allocation rule are added to the source object values.

At decision block 1506, in at least one of the various embodiments, if a terminal condition is met, control may flow to block 1508. Otherwise, in at least one of the various embodiments, control may loop back to block 1502 to continue running the recursive allocation rule. See, FIG. 14, block 1406 for additional descriptions of terminal conditions that are applicable to at least one of the various embodiments that are enabled to support incremental rule processing.

At block 1508, in at least one of the various embodiments, the final source value and the final target value may be corrected by applying an offset value. In at least one of the various embodiments, the offset may be equal to the starting values of the source object. Also, in at least one of the various embodiments, the offset value may be determined by a user that may be designing and/or using the model. In other words, the particular offset value used may depend on the model and its application. Next, control may be returned to a calling process.

Figure 16:
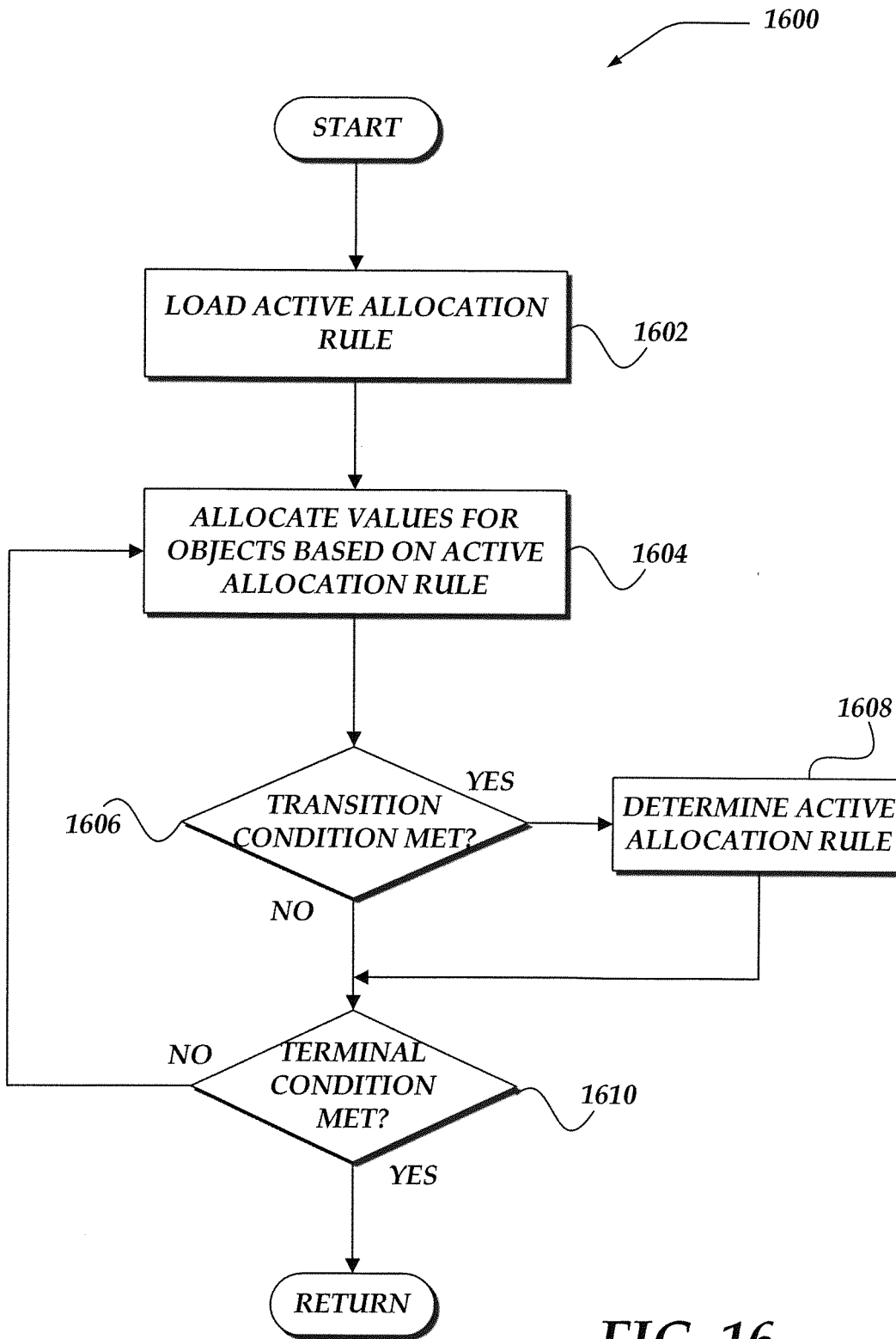
FIG. 16 illustrates a flowchart for a process for allocating costs in data model using recursive allocation rules in accordance with at least one of the various embodiments.

FIG. 16 illustrates a flowchart for process 1600 for allocating costs in data model using recursive allocation rules in accordance with at least one of the various embodiments. After a start block, at block 1602, the active allocation rules may be loaded and/or retrieved by a Budgeting and Forecasting Platform, such as, BFP 107, if necessary. At block 1604, in at least one of the various embodiments, values for objects may be allocated based on the active allocation rule. (See, FIG. 14 and FIG. 15.)

At decision block 1606, in at least one of the various embodiments, if a rule transition condition is met, control may flow to block 1608. Otherwise, in at least one of the various embodiments, control may be flow decision block 1610.

In at least one of the various embodiments, a transition condition may be similar to terminal conditions, except they do not signal that recursive allocation rule should stop running. Rather, in at least one of the various embodiments, transition conditions indicate that, based on the results being generated by the active allocation rule, another allocation rule may be activated.

At block 1608, in at least one of the various embodiments, the active allocation rule may be determined. In at least one of the various embodiments, the data structure that may be used to implement a recursive allocation rule may include attributes that may be used to define transition conditions as well as indicating which allocation rule should be activated.

In at least one of the various embodiments, a user may define the one or more transition conditions and associate allocation rules with each transition condition. Next, control may flow to decision block 1610.

At decision block 1610, in at least one of the various embodiments, if a terminal condition may be met, the processing of the recursive allocation rules may be complete and control may be returned to a calling process. Otherwise, in at least one of the various embodiments, control may loop back to block 1604 to continue processing the recursive allocation rule. (See, FIG. 14, block 1406 and accompanying description for terminal conditions embodiments.)

Figure 17:
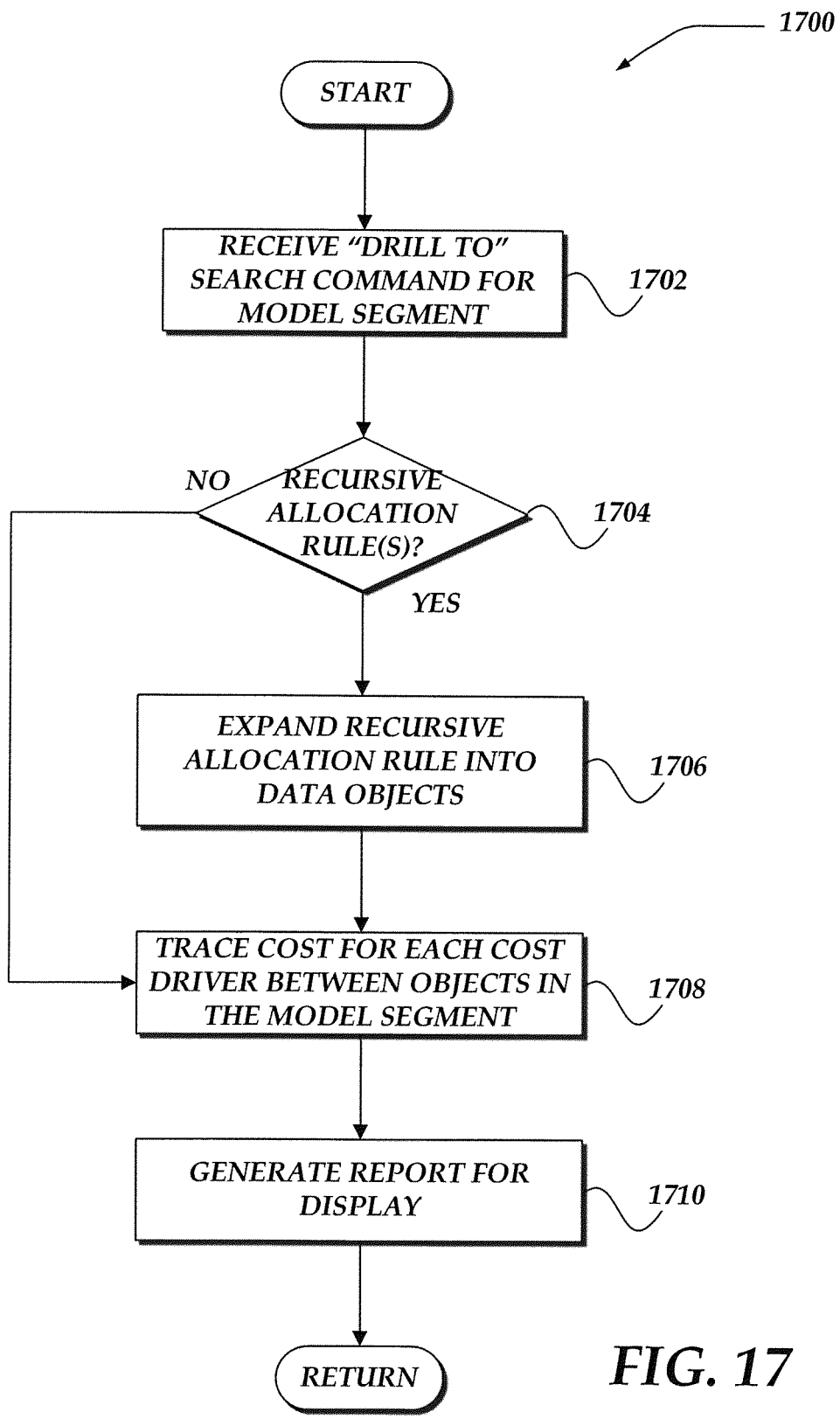
FIG. 17 illustrates a flowchart for a process for drilling down through a data model that includes recursive allocation rules in accordance with at least one of the various embodiments.

FIG. 17 illustrates a flowchart for process 1700 for drilling down through a data model that includes recursive allocation rules in accordance with at least one of the various embodiments. After a start block, at block 1702, in at least one of the various embodiments, a search command that initiates a report that includes a drill-down or "drill-to" operation for a portion of a data model (e.g., model segment) may be received. In at least one of the various embodiments, such a search command may express a user's intention to view/analyze how individual cost drivers contribute costs that have been allocated to a business unit (or other model object) within a data model. In at least one of the various embodiments, such a search command may be limited to designated portions of a data model, including a segment that includes the entire data model.

At decision block 1704, in at least one of the various embodiments, if the model segment designated for the search command includes recursive allocation rules, control may flow to block 1706; otherwise, in at least one of the various embodiments, control may flow to block 1708.

At block 1706, in at least one of the various embodiments, the recursive allocations rules that may be in the model segment may be expanded. In at least one of the various embodiments, the recursive allocation rule detail information, such as, recursive allocation rule detail 914, may include the information that may be employed to expand the recursive allocation rule. For example, the detail information may include the number of iterations performed by the rule, the terminating condition that was used for a recursive allocation rule, whether the rules may be using incremental accumulation, or the like.

In at least one of the various embodiments, rather than simply computing and storing the information produced by running the rule recursively, process 1700 may generate one or more temporary data model object that model each iteration of the recursive rule. In at least one of the various embodiments, these temporary data model objects may be used to temporarily substitute for the recursive allocation rule and placed into the data model enabling the information obscured by the recursion to be made available.

For example, in at least one of the various embodiments, to accommodate a drill down search tracing from BU 906 to BS 904, recursive allocation rule 912 may be expanded. Continuing with this example, in at least one of the various embodiments, expanding recursive allocation rule 912 may result in a data model as shown in FIG. 12, where model objects 1208-1224 may be generated and temporarily placed in the data model enabling the information that may have been obscured by the recursive allocation rule to be visible and/or accessible for responding to the search command.

At block 1708, in at least one of the various embodiments, the costs for each cost driver between each data model object in the model segment may be traced in reverse direction. For example, in at least one of the various embodiments, if the recursive allocation rule example in to be like model 1200 in FIG. 12, objects 1208-1224 may be added to the model as temporary objects. This would a enable a report to include information such as, the allocations from BS object 1210 to BU object 1212 which would include the $100 of Admin costs being allocated to Sales. Otherwise, in at least one of the various embodiments, absent the temporary expansion of the recursive allocation rule, that information would likely be obscured.

At block 1710, in at least one of the various embodiments, a report that includes results responsive to the search command from that was received at block 1702 may be generated and/or displayed. Next, in at least one of the various embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for allocating costs for a plurality of cost objects employing a network device, wherein one or more processors in the network device execute instructions to perform the method, comprising:

instantiating an allocation application to perform actions, including:
   providing a source object and a target object in a data model that is comprised of nodes and edges stored in the memory of network device;
   traversing data structures that enable a graph traversal of the data model from the source object to the target object to reach at least one recursive allocation rule, wherein the at least one recursive allocation rule defines at least an allocation of costs from the source object to the target object and a terminal condition for the at least one recursive allocation rule, and wherein use of the at least one recursive allocation rule optimizes both generation and maintenance of the data model; and
   until at least a portion of the terminal condition is met, wherein the terminal condition includes at least a precision threshold and an iteration threshold, recursively performing further actions, including:
      providing, by the one or more processors, a target cost value that corresponds to the target object from at least one active allocation rule being applied to a source cost value that corresponds to the source object, wherein the generated target cost value is an allocation of costs from the source object to the target object;
      providing, by the one or more processors, a modified source cost value that corresponds to the source object and the at least one active allocation rule being applied to the provided target cost value that corresponds to the target object, wherein the modified source cost value is taken as the source cost value in a next recursive iteration; and
      when a transition condition is met, providing, by the one or more processors, at least one other allocation rule associated with the transition condition, wherein the transition condition indicates the at least one other allocation rule for activation; and instantiating a forecasting application on the network device and a client device to perform actions, including:
   providing, by the one or more processors, a final cost value that corresponds to the target object from the target cost value and the at least one recursive allocation rule;

providing, by the one or more processors, another final cost value that corresponds to the source object from the source cost value and the at least one recursive allocation rule; and updating, by the one or more processors, the data model to reflect the allocation of costs from the source object to the target object based on the application of the recursive allocation rule, wherein the at least one recursive allocation rule encapsulates details for the allocation of costs between objects in the data model; and instantiating a video display application to perform actions, including:

providing for a video display adapter, the report that displays both provided final cost values in the data model.

2. The method of claim 1, wherein the terminal condition is met if the precision threshold is met before the iteration threshold is met.

3. The method of claim 1, wherein the terminal condition is met if a measured value of costs to be allocated falls below a defined precision threshold value.

4. The method of claim 1, further comprising, providing, by the one or more processors, another allocation rule when a transition condition is met, wherein the transition condition is triggered when a measured value of costs to be allocated falls below at least one defined precision threshold or a number of recursions at least meets the iteration threshold.

5. The method claim 1, wherein the modified other cost value that corresponds to the source object, further comprises, incrementing the other cost value based on the provided cost value that corresponds the target object.

6. The method of claim 1, further comprising, providing, by the one or more processors, a correction offset value to at least one of the final cost value that corresponds to the target object or the other final cost value that corresponds to the source object based on the at least one recursive allocation rule, wherein the correction offset value is at least one of a starting cost value of the source object, or a value that is determined by user input.

7. The method of claim 1, wherein the report, further comprises, providing an emphasized connector leading from the target object to the source object.

8. The method of claim 1, further comprising:

in response to a drilldown search command, performing further actions, including:

providing, by the one or more processors, at least one temporary cost object in the data model based on a number of iterations in the at least one allocation rule; and providing, by the one or more processors, at least one temporary cost value between each temporary cost object based on the at least one recursive allocation rule.

9. A network device for allocating costs for a plurality of cost objects, comprising:

a transceiver for communicating over the network;

a memory for storing at least instructions;

one or more processor devices that execute instructions that perform a method, including:

instantiating an allocation application to perform actions, including:

providing a source object and a target object in a data model that is comprised of nodes and edges stored in the memory of network device;

traversing data structures that enable a graph traversal of the data model from the source object to the target object to reach at least one recursive allocation rule, wherein the at least one recursive allocation rule defines at least an allocation of costs from the source object to the target object and a terminal condition for the at least one recursive allocation rule, and wherein use of the at least one recursive allocation rule optimizes both generation and maintenance of the data model; and until at least a portion of the terminal condition is met, wherein the terminal condition includes at least a precision threshold and an iteration threshold, recursively performing further actions, including:

providing a target cost value that corresponds to the target object from at least one active allocation rule being applied to a source cost value that corresponds to the source object, wherein the generated target cost value is an allocation of costs from the source object to the target object;

providing a modified source cost value that corresponds to the source object and the at least one active allocation rule being applied to the provided target cost value that corresponds to the target object, wherein the modified source cost value is taken as the source cost value in a next recursive iteration; and when a transition condition is met, providing at least one other allocation rule associated with the transition condition, wherein the transition condition indicates the at least one other allocation rule for activation; and instantiating a forecasting application on the network device and a client device to perform actions, including:

providing a final cost value that corresponds to the target object from the target cost value and the at least one recursive allocation rule;

providing another final cost value that corresponds to the source object from the source cost value and the at least one recursive allocation rule; and updating, by the one or more processors, the data model to reflect the allocation of costs from the source object to the target object based on the application of the recursive allocation rule, wherein the at least one recursive allocation rule encapsulates details for the allocation of costs between objects in the data model; and instantiating a video display application to perform actions, including:

providing for a video display adapter, the report that displays both provided final cost values in the data model.

10. The network device of claim 9, wherein the terminal condition is met if the precision threshold is met before the iteration threshold is met.

11. The network device of claim 9, wherein the terminal condition is met if a measured value of costs to be allocated falls below a defined precision threshold value.

12. The network device of claim 9, wherein the one or more processor devices execute instructions that perform actions, further comprising, providing, by the one or more processors, another allocation rule when a transition condition is met, wherein the transition condition is triggered when a measured value of costs to be allocated falls below at least one defined precision threshold or a number of recursions at least meets the iteration threshold.

13. The network device of claim 9, wherein the modified other cost value that corresponds to the source object, further comprises, incrementing the other cost value based on the provided-cost value that corresponds the target object.

14. The network device of claim 9, wherein the one or more processor devices execute instructions that perform actions, further comprising, providing, by the one or more processors, a correction offset value to at least one of the final cost value that corresponds to the target object or the other final cost value that corresponds to the source object based on the at least one recursive allocation rule, wherein the correction offset value is at least one of a starting cost value of the source object, or a value that is determined by user input.

15. The network device of claim 9, wherein the report, further comprises, providing an emphasized connector leading from the target object to the source object.

16. A processor readable non-transitory storage media that includes instructions for allocating costs for a plurality of cost objects, wherein one or more processors in a network device execute at least a portion of the instructions to perform a method, comprising:
    instantiating an allocation application to perform actions, including:
        providing a source object and a target object in a data model that is comprised of nodes and edges stored in a memory of network device;
        traversing data structures that enable a graph traversal of the data model from the source object to the target object to reach at least one recursive allocation rule, wherein the at least one recursive allocation rule defines at least an allocation of costs from the source object to the target object and a terminal condition for the at least one recursive allocation rule, and wherein use of the at least one recursive allocation rule optimizes both generation and maintenance of the data model; and
        until at least a portion of the terminal condition is met, wherein the terminal condition includes at least a precision threshold and an iteration threshold, recursively performing further actions, including:
            providing, by the one or more processors, a target cost value that corresponds to the target object from at least one active allocation rule being applied to a source cost value that corresponds to the source object, wherein the generated target cost value is an allocation of costs from the source object to the target object;
            providing, by the one or more processors, a modified source cost value that corresponds to the source object and the at least one active allocation rule being applied to the provided target cost value that corresponds to the target object, wherein the modified source cost value is taken as the source cost value in a next recursive iteration; and
            when a transition condition is met, providing, by the one or more processors, at least one other allocation rule associated with the transition condition, wherein the transition condition indicates the at least one other allocation rule for activation; and
    instantiating a forecasting application on the network device and a client device to perform actions, including:
        providing, by the one or more processors, a final cost value that corresponds to the target object from the target cost value and the at least one recursive allocation rule;
        providing, by the one or more processors, another final cost value that corresponds to the source object from the source cost value and the at least one recursive allocation rule; and
        updating, by the one or more processors, the data model to reflect the allocation of costs from the source object to the target object based on the application of the recursive allocation rule, wherein the at least one recursive allocation rule encapsulates details for the allocation of costs between objects in the data model; and
    instantiating a video display application to perform actions, including:
        providing for a video display adapter, the report that displays both provided final cost values in the data model.

17. The media of claim 16, wherein the terminal condition is met if the precision threshold is met before the iteration threshold is met.

18. The media of claim 16, wherein the terminal condition is met if a measured value of costs to be allocated falls below a defined precision threshold value.

19. The media of claim 16, further comprising, providing, by the one or more processors, another allocation rule when a transition condition is met, wherein the transition condition is triggered when a measured value of costs to be allocated falls below at least one defined precision threshold or a number of recursions at least meets the iteration threshold.

20. The media of claim 16, wherein the modified other cost value that corresponds to the source object, further comprises, incrementing the other cost value based on the provided cost value that corresponds the target object.

21. The media of claim 16, further comprising, providing, by the one or more processors, a correction offset value to at least one of the final cost value that corresponds to the target object or the other final cost value that corresponds to the source object based on the at least one recursive allocation rule, wherein the correction offset value is at least one of a starting cost value of the source object, or a value that is determined by user input.

22. The media of claim 16, wherein the report, further comprises, providing an emphasized connector leading from the target object to the source object.

23. A system for allocating costs for a plurality of cost objects, comprising:
    a network device, including:
        a transceiver for communicating over the network;
        a memory for storing at least instructions;
        one or more processor devices that execute instructions that perform actions, including:
            instantiating an allocation application to perform actions, including:
                providing a source object and a target object in a data model that is comprised of nodes and edges stored in the memory of network device;
                traversing data structures that enable a graph traversal of the data model from the source object to the target object to reach at least one recursive allocation rule, wherein the at least one recursive allocation rule defines at least an allocation of costs from the source object to the target object and a terminal condition for the at least one recursive allocation rule, and wherein use of the at least one recursive allocation rule optimizes both generation and maintenance of the data model; and until at least a portion of the terminal condition is met, wherein the terminal condition includes at least a precision threshold and an iteration threshold, recursively performing further actions, including:
  providing a target cost value that corresponds to the target object from at least one active allocation rule being applied to a source cost value that corresponds to the source object, wherein the generated target cost value is an allocation of costs from the source object to the target object;
  providing a modified source cost value that corresponds to the source object and the at least one active allocation rule being applied to the provided target cost value that corresponds to the target object, wherein the modified source cost value is taken as the source cost value in a next recursive iteration; and
  when a transition condition is met, providing at least one other allocation rule associated with the transition condition, wherein the transition condition indicates the at least one other allocation rule for activation; and instantiating a forecasting application on the network device and a client device to perform actions, including:
  providing a final cost value that corresponds to the target object from the target cost value and the at least one recursive allocation rule;
  providing another final cost value that corresponds to the source object from the source cost value and the at least one recursive allocation rule; and
  updating, by the one or more processors, the data model to reflect the allocation of costs from the source object to the target object based on the application of the recursive allocation rule, wherein the at least one recursive allocation rule encapsulates details for the allocation of costs between objects in the data model; and instantiating a video display application to perform actions, including:
  providing for a video display adapter, the report that displays both provided final cost values in the data model; and the client network device, including:
  a transceiver for communicating over the network;
  a memory for storing at least instructions;
  one or more processor devices that execute instructions that perform actions, including:
    providing information to the network device for generating the data model; and
    employing the video display adapter to display, to the user, a displayable report that is related to the data model.

24. The system of claim 23, wherein the terminal condition is met if the precision threshold is met before the iteration threshold is met.

25. The system of claim 23, wherein the terminal condition is met if a measured value of costs to be allocated falls below a defined precision threshold value.

26. The system of claim 23, wherein the one or more processor devices of the network device execute instructions that perform actions, further comprising, providing, by the one or more processors, another allocation rule when a transition condition is met, wherein the transition condition is triggered when a measured value of costs to be allocated falls below at least one defined precision threshold or a number of recursions at least meets the iteration threshold.

27. The system of claim 23, wherein the modified other cost value that corresponds to the source object, further comprises, incrementing the other cost value based on the provided cost value that corresponds the target object.

28. The system of claim 23, wherein the one or more processor devices of the network device execute instructions that perform actions, further comprising, providing, by the one or more processors, a correction offset value to at least one of the final cost value that corresponds to the target object or the other final cost value that corresponds to the source object based on the at least one recursive allocation rule, wherein the correction offset value is at least one of a starting cost value of the source object, or a value that is determined by user input.

29. The system of claim 23, wherein the report, further comprises, providing an emphasized connector leading from the target object to the source object.

30. The system of claim 23, wherein the one or more processor devices of the network device execute instructions that perform actions, further comprising:
  in response to a drilldown search command, performing further actions, including:
    providing, by the one or more processors, at least one temporary cost object in the data model based on a number of iterations in the at least one allocation rule; and
    providing, by the one or more processors, at least one temporary cost value between each temporary cost object based on the at least one recursive allocation rule.

* * * * *